(12) United States Patent
Abraham

(10) Patent No.: US 12,470,606 B2
(45) Date of Patent: Nov. 11, 2025

(54) SYSTEMS AND METHODS FOR SCHEDULING FEATURE ACTIVATION AND DEACTIVATION FOR COMMUNICATION DEVICES IN A MULTIPLE-DEVICE ACCESS ENVIRONMENT

(71) Applicant: Avaya Management L.P., Durham, NC (US)

(72) Inventor: Jinson Abraham, Stittsville (CA)

(73) Assignee: Avaya Management L.P., Durham, NC (US)

( * ) Notice: Subject to any disclaimer, the term of this patent is extended or adjusted under 35 U.S.C. 154(b) by 28 days.

(21) Appl. No.: 17/581,621

(22) Filed: Jan. 21, 2022

(65) Prior Publication Data

US 2023/0239329 A1    Jul. 27, 2023

(51) Int. Cl.
| | |
|---|---|
| *H04L 65/1059* | (2022.01) |
| *H04L 65/1094* | (2022.01) |
| *H04L 65/1096* | (2022.01) |
| *H04L 65/1104* | (2022.01) |

(52) U.S. Cl.
CPC ...... *H04L 65/1059* (2013.01); *H04L 65/1094* (2022.05); *H04L 65/1096* (2013.01); *H04L 65/1104* (2022.05)

(58) Field of Classification Search
CPC ............ H04L 65/1059; H04L 65/1083; H04L 65/1096
See application file for complete search history.

(56) References Cited

U.S. PATENT DOCUMENTS

| | | | |
|---|---|---|---|
| 7,398,061 B2 | 7/2008 | Mousseau | |
| 2001/0049275 A1* | 12/2001 | Pierry | H04W 8/005 455/414.1 |
| 2006/0246926 A1* | 11/2006 | Eng | H04W 4/16 455/414.1 |
| 2013/0143629 A1* | 6/2013 | Walling, III | H04M 1/72451 455/567 |
| 2013/0183930 A1* | 7/2013 | Rao | H04N 21/2543 455/406 |
| 2014/0109003 A1 | 4/2014 | Saib et al. | |

(Continued)

FOREIGN PATENT DOCUMENTS

WO    WO 2018/023742    2/2018

*Primary Examiner* — Kamal B Divecha
*Assistant Examiner* — Eui H Kim
(74) *Attorney, Agent, or Firm* — Sheridan Ross P.C.

(57) ABSTRACT

A method for scheduling feature operations on a remote server to modify a behavior of at least one communication device of a plurality of communication devices includes receiving, by the remote server, an entry for at least one feature operation for the at least one communication device of the plurality of communication devices registered with a same extension. The entry includes a scheduled date and a scheduled time for the at least one feature operation. The method also includes processing, by the remote server, entry to determine how to handle an incoming call during the scheduled date and the scheduled time for the at least one feature operation. The method further includes generating, by the remote server, a scheduled feature operation for the entry and modifying, by the remote server, the behavior of the at least one communication device based on the scheduled feature operation.

20 Claims, 9 Drawing Sheets

(56) References Cited

U.S. PATENT DOCUMENTS

| | | | |
|---|---|---|---|
| 2014/0298198 A1* | 10/2014 | Kuchibhotla | G06F 40/166 |
| | | | 715/753 |
| 2016/0021193 A1 | 1/2016 | Fischer et al. | |
| 2016/0044167 A1* | 2/2016 | Bostick | H04M 3/42365 |
| | | | 455/414.1 |
| 2017/0168888 A1* | 6/2017 | Prasad | G06F 11/0721 |
| 2018/0077260 A1* | 3/2018 | Faltyn | H04M 3/42323 |
| 2019/0288970 A1* | 9/2019 | Siddiq | H04L 51/043 |
| 2020/0259951 A1* | 8/2020 | Arshad | H04M 3/4211 |
| 2021/0158305 A1* | 5/2021 | Factor | G06Q 10/1095 |
| 2022/0116345 A1* | 4/2022 | Xu | H04L 67/141 |
| 2023/0188378 A1* | 6/2023 | Heo | H04L 67/12 |
| | | | 709/201 |

* cited by examiner

SYSTEMS AND METHODS FOR SCHEDULING FEATURE ACTIVATION AND DEACTIVATION FOR COMMUNICATION DEVICES IN A MULTIPLE-DEVICE ACCESS ENVIRONMENT

FIELD OF THE DISCLOSURE

The present disclosure relates generally to systems and methods for controlling communication devices and particularly to systems and methods for scheduling feature activation and deactivation for registered communication devices in a multiple-device access (MDA) environment to control the behavior of the registered communication devices.

BACKGROUND

Currently, several communication systems exist that allow a user to login multiple Session Initiation Protocol ("SIP") devices or endpoints (e.g., with a server, etc.) simultaneously registered with the same extension. This technology is known as multiple-device access (MDA). When a user operates one of the multiple devices, the user may be offered with various features, such as notification features, adjustment features, call features, etc. For example, regarding a notification feature and/or an adjustment feature, a user must manually adjust the volume of the ring tone of a device (e.g., by pressing buttons on the device or on the touchscreen on the device). This operation must be performed on each of the registered devices of the user to adjust the volume for each of the devices. Therefore, if the user forgets or does not want to adjust the volume of the ring tone for one or more of the registered devices, the user's inaction may disturb the user during an inconvenient time or provide less than optimal results for the ring tone adjustment feature and/or notification feature of the device when the user receives and incoming call.

The call features may be implemented during an active communication session and/or to handle incoming communication sessions. Call features that may be implemented during an active communication session include transferring the communication session, conferencing in other users to the active communication session, recording the communication session, etc. Other call features are used for routing incoming communication sessions. For example, a user can administer call-forwarding/redirection for incoming calls (e.g., activate call-forwarding on their extension), to forward all calls to a specified destination. One enhancement to call-forwarding is the ability to specify different destinations. For example, internal callers can be forwarded to one destination (e.g., user's mobile number) and external callers can be forwarded to another destination (e.g., a colleague). These call features are also manually performed on each of the registered devices. For the notification features, the user is likewise required to manually activate or deactivate the notification features (e.g., scheduling events) on each of the registered devices to achieve optimal results. Therefore, there is a need for automatically activating and deactivating features for registered communication devices in a MDA environment, based on a set schedule, in a simple operation.

SUMMARY

These and other needs are addressed by the various embodiments and configurations of the present disclosure. The present disclosure can provide a number of advantages depending on the particular configuration. These and other advantages will be apparent from the disclosure contained herein. In one embodiment, a method for scheduling feature operations on a remote server to modify a behavior of at least one communication device of a plurality of communication devices includes receiving, by the remote server, any entry for at least one feature operation for the at least one communication device of the plurality of communication devices registered with a same extension. The entry includes a scheduled date and a scheduled time for the at least one feature operation. The method also includes processing, by the remote server, the entry to determine how to handle an incoming call during the scheduled date and the scheduled time for the at least one feature operation. The method further includes generating, by the remote server, a scheduled feature operation for entry and modifying, by the remote server, the behavior of the at least one communication device based on the scheduled feature operation.

The phrases "at least one," "one or more," "or," and "and/or" are open-ended expressions that are both conjunctive and disjunctive in operation. For example, each of the expressions "at least one of A, B, and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B, and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an embodiment that is entirely hardware, an embodiment that is entirely software (including firmware, resident software, micro-code, etc.) or an embodiment combining software and hardware aspects that may all generally be referred to herein as a "circuit," "module," or "system." Any combination of one or more computer-readable medium(s) may be utilized. The computer-readable medium may be a computer-readable signal medium or a computer-readable storage medium.

A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such as a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable medium may be transmitted using any appropriate medium, including, but not limited to, wireless, wireline, optical fiber cable, RF, etc., or any suitable combination of the foregoing.

The terms "determine," "calculate," "compute," and variations thereof, as used herein, are used interchangeably and include any type of methodology, process, mathematical operation or technique.

The term "means" as used herein shall be given its broadest possible interpretation m accordance with 35 U.S.C., Section 112(f) and/or Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

The preceding is a simplified summary of the disclosure to provide an understanding of some aspects of the disclosure. This summary is neither an extensive nor exhaustive overview of the disclosure and its various embodiments. It is intended neither to identify key or critical elements of the disclosure nor to delineate the scope of the disclosure but to present selected concepts of the disclosure in a simplified form as an introduction to the more detailed description presented below. As will be appreciated, other embodiments of the disclosure are possible utilizing, alone or in combination, one or more of the features set forth above or described in detail below. Also, while the disclosure is presented in terms of exemplary embodiments, it should be appreciated that an individual aspect of the disclosure can be separately claimed.

BRIEF DESCRIPTION OF THE DRAWINGS

The present disclosure is described in conjunction with the appended figures.

DETAILED DESCRIPTION

Figure 1:
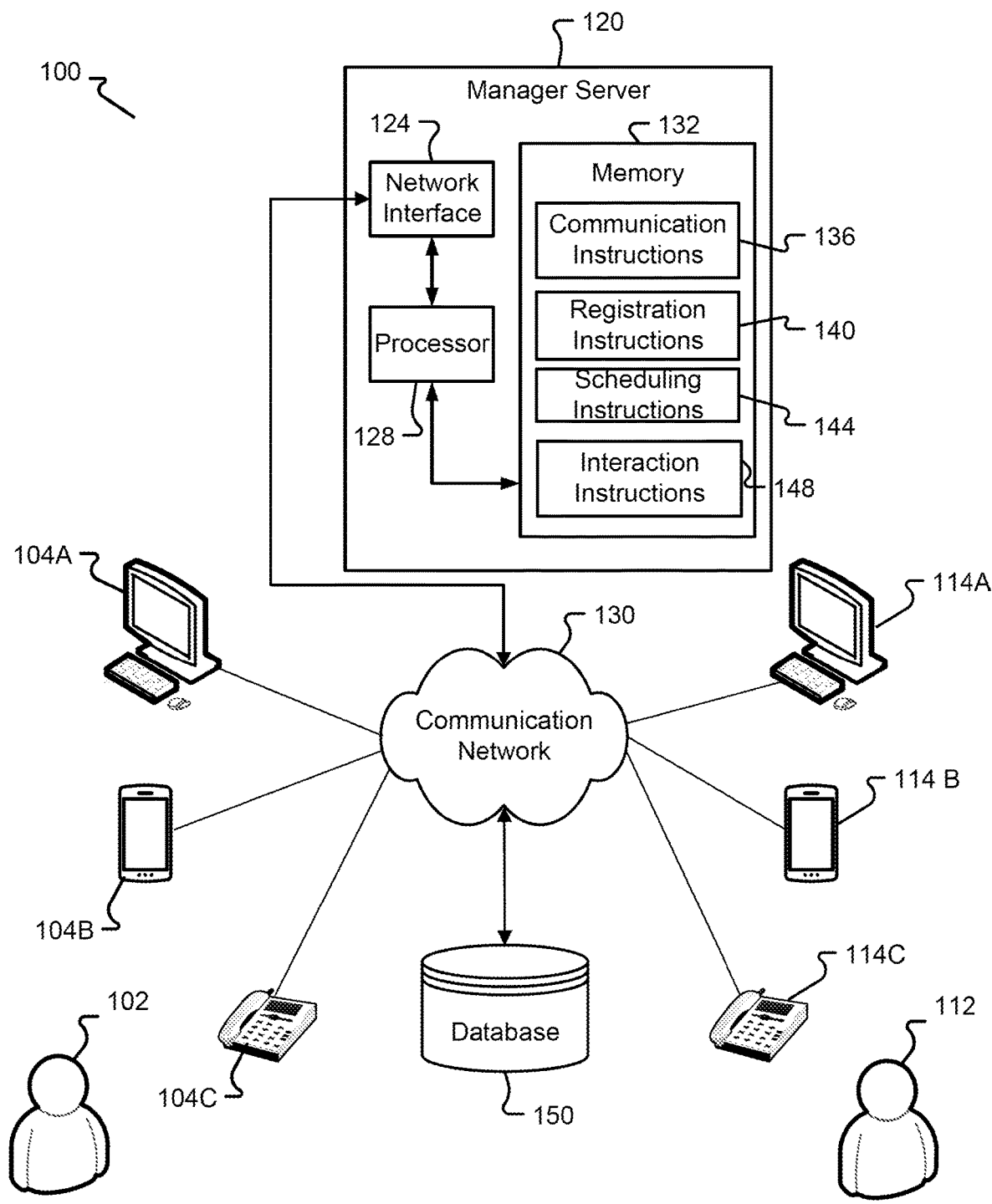
FIG. 1 depicts a block diagram of a communication system in accordance with embodiments of the present disclosure.

In the following description, for the purposes of explanation, numerous specific details are set forth in order to provide a thorough understanding of various embodiments disclosed herein. It will be apparent, however, to one skilled in the art that various embodiments of the present disclosure may be practiced without some of these specific details. The ensuing description provides exemplary embodiments only, and is not intended to limit the scope, applicability, or configuration of the claims. Furthermore, to avoid unnecessary obscuring the present disclosure, the preceding description omits a number of known structures and devices. This omission is not to be construed as a limitation of the scope of the claims. Rather, the ensuing description of the exemplary embodiments will provide those skilled in the art with an enabling description for implementing the exemplary embodiments. It should however be understood and appreciated that various changes may be made in the function and arrangement of elements without departing from the spirit and scope of the appended claims.

Any reference in the description comprising an element number, without a sub element identifier when a sub element identifier exists in the figures, when used in the plural, is intended to reference any two or more elements with a like element number. When such a reference is made in the singular form, it is intended to reference one of the elements with the like element number without limitation to a specific one of the elements. Any explicit usage herein to the contrary or providing further qualification or identification shall take precedence.

The exemplary systems and methods of this disclosure will also be described in relation to analysis software, modules, and associated analysis hardware. However, to avoid unnecessarily obscuring the present disclosure, the following description omits well-known structures, components, and devices, which may be omitted from or shown in a simplified form in the figures or otherwise summarized.

For purposes of explanation, numerous details are set forth in order to provide a thorough understanding of the present disclosure. It should be appreciated, however, that the present disclosure may be practiced in a variety of ways beyond the specific details set forth herein.

The terms "extension" and/or "communication channel," and variations thereof may be used interchangeably herein and may refer to a communications transmission channel that is associated with a user and that provides a dedicated channel for communications made to or from the user. The extension may correspond to a unique number associated with a user and that can be logged into (e.g., registered, etc.) via one or more communication devices to enable communications over the extension. As provided herein a user may register multiple communication devices (e.g., in multiple-device access environment, etc.) with the extension such that each of the registered communication devices can use the same communications channel to send and receive communications, messages, and/or protocol signals, etc.

FIG. 1 is a block diagram of an illustrative communication system 100 shown in accordance with embodiments of the present disclosure. The communication system 100 of FIG. 1 may be a distributed system and, in some embodiments, comprises a communication network 130 connecting one or more communication devices 104A-104C and 114A-114C with manager server 120. According to one embodiment of the present disclosure, manager server 120 may by a SIP session manager server. The communication system 100 may include, but is not limited to, a first communication device 104A, a second communication device 104B, and a third communication device 104C registered with a common extension associated with a user 102 via the manager server 120. The communication system 100 may also include a first communication device 114A, a second communication device 114B, and a third communication device 114C registered with a common extension associated with a user 112 via the manager server 120. The manager server 120 communicates with a database 150.

The manager server 120 may provide collaborative communication sessions, conference meetings, multi-party calls, SIP functionality, and/or other audio/video communication services. In some embodiments, the manager server 120 allows the multiple communication devices 104A-104C to be registered with the same extension simultaneously (e.g., providing selective access to the communication channel associated with the user 102 from each registered communication device 104A-104C, etc.) and the manager server 120 also allows the multiple communication devices 114A-114C to be registered with the same extension simultaneously (e.g., providing selective access to the communication channel associated with a user 112 from each registered communication device 114A-114C, etc.). Accordingly, the communication system 100 shown in FIG. 1 may be referred to herein as a multiple-device access environment. According to an alternative embodiment of the present disclosure, multiple communication devices 104A-104C may be registered with one or more different extensions associated with user 102 and multiple communication devices 114A-114C may be registered with one or more different extensions associated with user 112.

As illustrated in FIG. 1, the user 102 may be able to access the functionality provided by the manager server 120 via one or more registered communication devices 104A-104C. In particular, each communication device 104A-104C may be registered with the manager server 120 using an extension that is associated with the user 102. The extension that is associated with the user 102 may be the same number, or communication channel, for each of the communication devices 104A-104C registered by the user 102.

Each of the communication devices 104A-104C may be associated with a particular geographical location and/or location type. For instance, and without limiting the present disclosure, the first communication device 104A may be associated with a first geographical location, the second communication device 104B may be associated with a second geographical location, and the third communication device 104C may be associated with a third geographical location. It is contemplated that more or fewer communication devices shown in FIG. 1 may be registered with the extension of the user 102 and one or more of the communication devices may be registered with a different extension for the user 102.

By way of example, and without limiting the present disclosure, the first geographical location may correspond to the home of the user 102 and the first communication device 104A may correspond to a desktop computer communication device type located at the home of the user 102; the second geographical location may correspond to a location of ownership and/or presence of the second communication device 104B, such as an office or work location, and the second communication device 104B may correspond to an office mobile communication device type (e.g., a mobile device); and the third geographical location may correspond to a location of ownership and/or presence of the third communication device 104C, such as an office or work location, and the third communication device 108C may correspond to a mobile communication device (e.g., a Bring-Your-Own-Device ("BYOD") phone, tablet, smartphone, mobile computer, etc.) of the user 102.

Likewise, each of the communication devices 114A-114C may be associated with a particular geographical location and/or location type. For instance, and without limiting the present disclosure, the first communication device 114A may be associated with a first geographical location, the second communication device 114B may be associated with a second geographical location, and the third communication device 114C may be associated with a third geographical location. It is contemplated that more or fewer communication devices shown in FIG. 1 may be registered with the extension of the user 112 and one or more of the communication devices may be registered with a different extension for the user 112.

By way of example, and without limiting the present disclosure, the first geographical location may correspond to the home of the user 112 and the first communication device 114A may correspond to a desktop computer communication device type located at the home of the user 112; the second geographical location may correspond to a location of ownership and/or presence of the second communication device 114B, such as an office or work location, and the second communication device 114B may correspond to an office mobile communication device type (e.g., a mobile device); and the third geographical location may correspond to a location of ownership and/or presence of the third communication device 114C, such as an office or work location, and the third communication device 114C may correspond to a mobile communication device (e.g., BYOD phone, tablet, smartphone, mobile computer, etc.) of the user 112.

It is an aspect of the present disclosure that a user 102/112 may want to schedule feature activation and deactivation for the communication devices. Feature activation and deactivation may include adjusting the settings or call features of one or more of the communication devices 104A-104C/114A-114C simultaneously. According to embodiments of the present disclosure as discussed in greater detail below, the user 102/112 can schedule for one or more features of the one or more communication devices 104A-104C/114A-114C to be turned on or turned off at specific times or during certain time intervals, which frees up the user 102/112 to focus on more important tasks. According to embodiments of the present disclosure as discussed in greater detail below, the user 102/112 is allowed to schedule settings that are automatically implemented for one or more of the communication devices 104A-104C/114A-114C which allows the user 102/112 to optimize features of the communication devices 104A-104C/114A-114C without having to repeatedly adjust the features for each of the communication devices 104A-104C/114A-114C.

In accordance with embodiments of the present disclosure, the communication network 130 may comprise any type of known communication medium or collection of communication media and may use any type of protocols to transport messages between endpoints. The communication network 130 may include wired and/or wireless communication technologies. The Internet is an example of the communication network 130 that constitutes an IP network consisting of many computers, computing networks, and other communication devices located all over the world, which are connected through many telephone systems and other means. Other examples of the communication network 130 include, without limitation, a standard Plain Old Telephone System ("POTS"), an Integrated Services Digital Network ("ISDN"), the Public Switched Telephone Network ("PSTN"), a Local Area Network ("LAN"), a Wide Area Network ("WAN"), a Voice over IP ("VoIP") network, a SIP network, a cellular network, and any other type of packet-switched or circuit-switched network known in the art. In addition, it can be appreciated that the communication network 130 need not be limited to any one network type, and instead may be comprised of a number of different networks and/or network types. The communication network 130 may comprise a number of different communication media such as coaxial cable, copper cable/wire, fiber-optic cable, antennas for transmitting/receiving wireless messages, and combinations thereof.

In some embodiments, at least one of the communication devices 104A-104C/114A-114C may correspond to a computing device, a personal communication device, a portable communication device, a laptop, a smartphone, a tablet, a personal computer, and/or any other device capable of running an operating system ("OS"), at least one voice application, a web browser, a SIP application, and/or the like. The SIP application may be configured to exchange communications between a respective communication device 104A-104C/114A-114C and the manager server 120. For instance, the communication devices 104A-104C/114A-114C may be configured to operate various versions of Microsoft Corp.'s Windows® and/or Apple Corp.'s Macintosh® operating systems, any of a variety of commercially-available UNIX® such as LINUX or other UNIX-like operating systems, iOS, Android®, etc. These communication devices 104A-104C/114A-114C, may also have any of a variety of applications, including for example, web browser applications, chat applications, video applications, social media applications, calling applications, email applications, calendar applications, clock applications, SIP applications, etc., and/or combinations thereof. In some embodiments, the communication devices 104A-104C/114A-114C may alternatively or additionally be any other electronic device, such as an Internet-enabled mobile telephone and/or a personal digital assistant, capable of communicating via the communication network 130.

Additionally or alternatively, communications may be sent and/or received via a respective communication device 104A-104C/114A-114C as a telephone call, a packet or collection of packets (e.g., IP packets transmitted over an IP network), an email message, an instant message ("IM"), a short message service ("SMS") message, a multimedia messaging service ("MIMS") message, a chat, and/or combinations thereof. In some embodiments, the communication devices 104A-104C/114A-114C may communicate over an audio and/or a video channel over the communication network 130.

The manager server 120 may include hardware and/or software resources that, among other things, provide the ability for multiple-device access where two or more of the communication devices 104A-104C/114A-114C are registered simultaneously with an extension of a user 102/112. Among other things, the manager server 120 may provide SIP functionality to allow the communication devices 104A-104C/114A-114C to hold multi-party calls, conference calls, and/or other collaborative communications over a same communication channel, or extension, that is associated with a user 102/112. The manager server 120 may include a network interface 124, a processor 128, and a memory 132. The SIP session manager may also comprise communication instructions 136, registration instructions 140, scheduling instructions 144, interaction instructions 148, registration data, scheduling data, and/or the like.

The network interface 124 provides the manager server 120 with the ability to send and receive communication packets or the like over the communication network 130. The network interface 124 may be provided as a network interface card ("NIC"), a network port, a modem, drivers for the same, and the like. Communications between the components of the manager server 120 and other devices connected to the communication network 130 may flow through the network interface 124 of the manager server 120. In some embodiments, examples of a suitable network interface 124 include, without limitation, an antenna, a driver circuit, an Ethernet port, a modulator/demodulator, an NIC, an RJ-11 port, an RJ-45 port, an RS-232 port, a USB port, etc. The network interface 124 may include one or multiple different network interfaces depending upon whether the manager server 120 is connecting to a single communication network or multiple different types of communication networks. For instance, the manager server 120 may be provided with both a wired network interface and a wireless network interface without departing from the scope of the present disclosure. In some embodiments, the network interface 124 may include different communication ports that interconnect with various input/output lines.

In some embodiments of the present disclosure, the processor 128 may correspond to one or more computer processing devices. For example, the processor 128 may be provided as silicon, an Application-Specific Integrated Circuit ("ASIC"), as a Field Programmable Gate Array ("FPGA"), any other type of Integrated Circuit ("IC") chip, a collection of IC chips, and/or the like. In some embodiments, the processor 128 may be provided as a Central Processing Unit ("CPU"), a microprocessor, or a plurality of microprocessors that are configured to execute the instructions sets stored in memory 132. Upon executing the instruction sets stored in memory 132, the processor 128 enables various communications, registrations, schedules (e.g., scheduled activation of notification, adjustment and/or call features, scheduled deactivation of notification, adjustment and/or call features, etc.) and/or interaction functions of the manager server 120, and provides communications over one or more extensions for one or more registered communication devices (e.g., communication devices 104A-104C/114A-114C, etc.) over the communication network 130.

The memory 132, or storage memory, may correspond to any type of non-transitory computer-readable medium. In some embodiments, the memory 132 may comprise volatile or non-volatile memory and a controller for the same. Non-limiting examples of the storage memory 132 that may be utilized in the manager server 120 may include Random Access Memory ("RAM"), Read Only Memory ("ROM"), buffer memory, flash memory, solid-state memory, or variants thereof. Any of these memory types may be considered non-transitory computer memory devices even though the data stored thereby can be changed one or more times. The memory 132 may be used to store information about registrations, extensions, users, authentication, activity status, history, schedules, and/or the like. In some embodiments of the present disclosure, the memory 132 may be configured to store rules and/or the instruction sets depicted in addition to temporarily storing data for the processor 128 to execute various types of routines or functions. Although not depicted, the memory 132 may include instructions that enable the processor 128 to store data into a database 150 and retrieve information from the database 150. According to embodiments of the present disclosure, information retrieved from the database 150 may include registration data and/or scheduling data. In some embodiments, the database 150 or data stored therein may be stored internal to the manager server 120 (e.g., within the memory 132 of the manager server 120 rather than in a separate database) or in a separate server.

The communication instructions 136, when executed by the processor 128, may provide the ability for at least one of the communication devices 104A-104C/114A-114C registered with an extension of a user 102/112 at the manager server 120 to conduct SIP messaging, hold or conduct communications, and/or otherwise send and receive messages via the extension. In accordance with embodiments of the present disclosure, the communication instructions 136 may comprise instructions that, when executed by the processor 128, enable a multiple-device access environment for the communication devices 104A-104C/114A-114C in the communication system 100. Among other things, the communication instructions 136 may allow a user 102/112 to have multiple communication devices 104A-104C/114A-114C, or endpoints, simultaneously registered with an extension of the user 102/112. For example, a user 102/112 may receive and place calls via multiple communication devices 104A-104C/114A-114C and even move calls between communication devices 104A-104C/114A-114C that are registered with the extension of the user 102/112. In one embodiment of the present disclosure, this multiple-device access environment may be used by a single user 102/112 and is not intended to be used by multiple users sharing the various communication devices 104A-104C/114A-114C that are registered with the extension of the single user 102/112. According to embodiments of the present disclosure, the user 102/112 may have additional extensions registered with different communication devices.

Additionally or alternatively, the communication instructions 136 may integrate all communication devices 104A-104C/114A-114C across the communication system 100 and may even use existing private branch exchange ("PBX") equipment, services, and/or infrastructure. The manager server 120 and the processor 128 executing the communication instructions 136 may enable SIP routing and integration. Examples of other functions performed via the communication instructions 136, when executed by the processor 128, include, but are in no way limited to, normalizing disparate networks, providing centralized routing of calls and management of user profiles, supporting converged voice and video bandwidth management, providing application sequencing capabilities, etc., and/or combinations thereof.

The manager server 120 may comprise registration management resources, such as the registration instructions 140 and/or other registration data stored in the memory 132 and/or the database 150 used to adjust registration of the one or more communication devices 104A-104C/114A-114C.

The manager server 120 may comprise scheduling management resources, such as the scheduling instructions 144 and/or other scheduling data stored in the memory 132 and/or the database 150 used to schedule the activation and/or deactivation of one or more features for the one or more communication devices 104A-104C/114A-114C. In some embodiments of the present disclosure, the registration instructions 140, when executed by the processor 128, may send and receive messages across the communication network 130 to one or more communication devices 104A-104C/114A-114C in the communication system 100 for enabling the remote simultaneous scheduling methods as described herein.

The scheduling instructions 144 may define rules and instructions for activating or deactivating one or more features of the one or more communication devices 104A-104C/114A-114C in the communication system 100 at the request of a user 102/112 via a communication device 104A-104C/114A-114C that is registered with the extension of the user 102/112. Alternatively, the scheduling instructions 144 may define rules and instructions for activating or deactivating one or more features of the one or more communication devices 104A-104C/114A-114C in the communication system 100 at the request of user 102/112 via a device that is not associated with the user 102/112 (e.g., a device that is not registered with the extension of the user 102/112 or a third-party web interface or product). For instance, the scheduling instructions 144, when executed by the processor 128, may cause the processor 128 to receive query messages requesting scheduling for one or more of the communication devices 104A-104C/114A-114C with the same extension from a user 102/112. After validating the user 102/112, the processor 128 may send a query response message to a requesting communication device 104A, receive a scheduling message from the requesting communication device 104A and confirm the schedule with the communication device 104A.

Additionally or alternatively, the scheduling instructions 144, when executed by the processor 128, may create, delete, modify, and/or otherwise update schedules for at least one of extensions, users, communication devices, etc., and/or combinations thereof. The scheduling instructions 144 may work in conjunction with the communication instructions 136, or vice versa, to perform at least some steps of the method described in conjunction with FIGS. 6 and 7, and as described herein.

The interaction instructions 148 may define rules and instructions for interactions between the manager server 120 and at least one of the registered communication devices 104A-104C/114A-114C in the communication system 100. The interaction instructions 148 may cause applications, web pages, pop-ups, and/or other digital interactions to be presented by the display of a registered communication device 104A-104C/114A-114C. The interaction instructions 148, when executed by the processor 132, may determine to present a user 102/112 with one or more scheduling options, settings, extensions, registration information, or other requests for input on a registered communication device 104A-104C/114A-114C. These interactions may be provided by sending a message to a registered communication device 104A-104C/114A-114C over the communication network 130 in the communication system 100 causing a display device of the registered communication device 104A-104C/114A-114C to render information and user-selectable options. The interaction instructions 148 may work in conjunction with the scheduling instructions 144, or vice versa, to perform at least some steps of the method described in conjunction with FIGS. 6 and 7, and as described herein.

Figure 2:
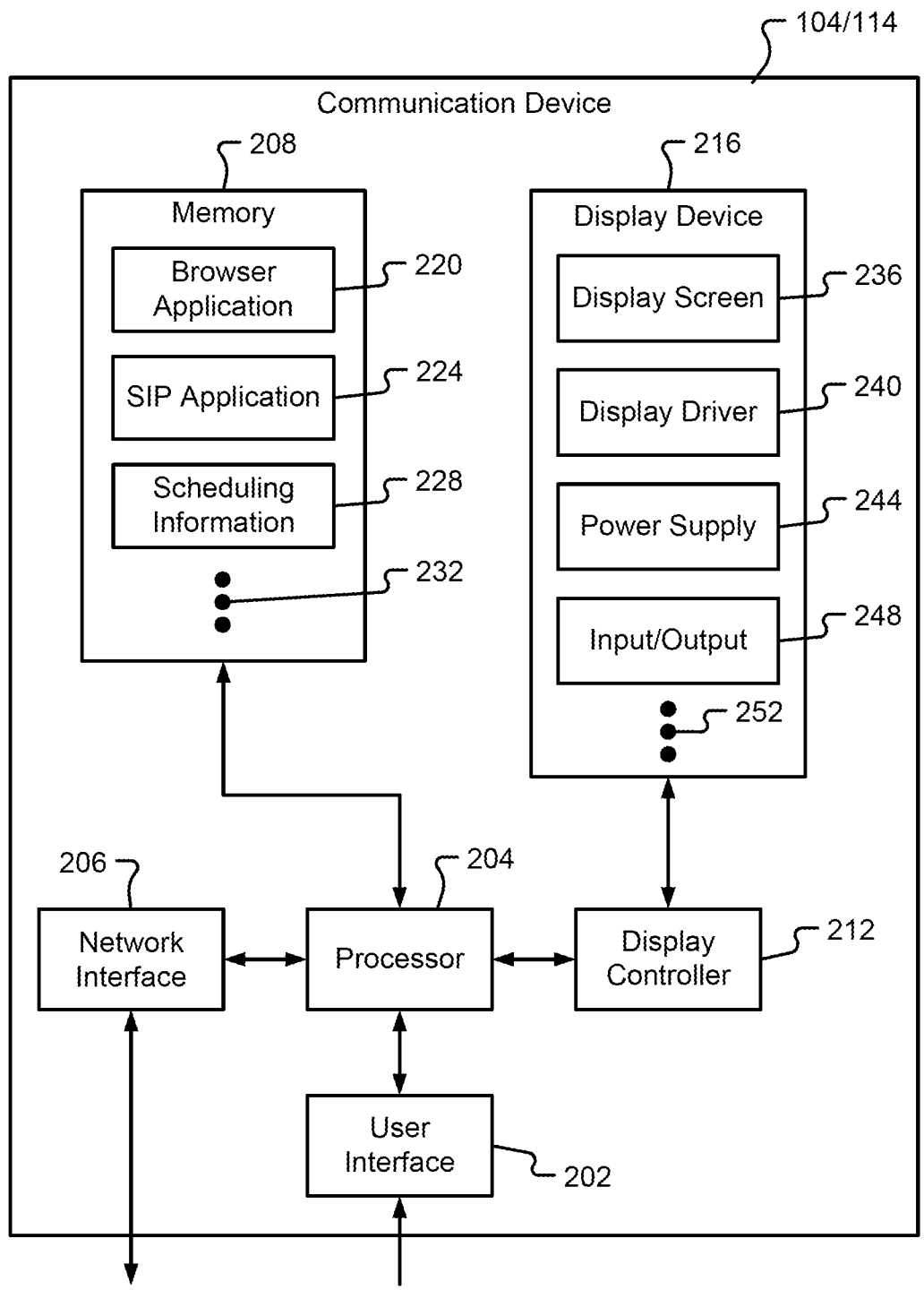
FIG. 2 is a block diagram depicting components of a communication device used in a communication system in accordance with embodiments of the present disclosure.

FIG. 2 is a block diagram depicting components of a communication device 104A-104C/114A-114C used in the communication system 100 in accordance with embodiments of the present disclosure. The communication device 104A-104C/114A-114C may correspond to any of the communication devices 104A-104C/114A-114C described in conjunction with FIG. 1, and vice versa. The communication device 104A-104C/114A-114C is shown to include a computer memory 208 that stores one or more instruction sets, applications, rules, information, or modules. The communication device 104A-104C/114A-114C may be configured as a desktop computer, smartphone, tablet, laptop, and/or the like. The communication device 104A-104C/114A-114C is also shown to include a user interface 202, one or more processors 204, a network interface 206 (e.g., a network communications interface, etc.), and a display controller 212 that may all be connected to one another via a power and/or a communications bus.

The user interface 202 may correspond to any type of input and/or output device, or combination thereof, that enables a user 102/112 to interact with the communication device 104A-104C/114A-114C. As can be appreciated, the nature of the user interface 202 may depend upon the nature of the communication device 104A-104C/114A-114C. Examples of the user interface 202 may include, but are in no way limited to, user interface hardware and devices such as at least one touch-sensitive display elements, buttons, switches, keyboards, peripheral interface devices (e.g., mice, controller, joysticks, etc.) as described herein. It is an aspect of the present disclosure that one or more devices in the user interface 206 may provide an input that is interpreted by the processor 204 in controlling one or more components of the communication device 104A-104C/114A-114C.

The processor 204 may correspond to one or many computer processing devices. Non-limiting examples of a processor include a microprocessor, an IC chip, a General Processing Unit ("GPU"), a CPU, or the like. Examples of the processor 204 as described herein may include, but are not limited to, at least one of Qualcomm® Snapdragon® 800 and 801, Qualcomm® Snapdragon® 620 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, ARM® Cortex™-M processors, ARM® Cortex-A and ARIV1926EJ-S™ processors, other industry-equivalent processors, and may perform computational functions using any known or future-developed standard, instruction set, libraries, and/or architecture. The processor 204 may be a multipurpose, programmable device that accept digital data as input, processes the digital data according to instructions stored in its internal memory, and provides results as output. The processor 204 may implement sequential digital logic as it has internal memory. As with most microprocessors, the processor 204 may operate on numbers and symbols represented in the binary numeral system. The processor 204 may be similar, if not identical, to the processor 128 described in conjunction with FIG. 1, or vice versa.

The network interface 206 may comprise hardware that facilitates communications with other communication devices (e.g., the manager server 120, other communication devices and/or servers, etc.) over the communication network 130. In some embodiments, the network interface 206 may include an Ethernet port, a Wi-Fi card, an NIC, a cellular interface (e.g., antenna, filters, and associated circuitry), or the like. The network interface 206 may be configured to facilitate a connection between the communication device 104A-104C/114A-114C and the manager server 120 via the communication network 130 and may further be configured to encode and decode communications (e.g., packets, etc.) according to a protocol utilized by the communication network 130.

The memory 208 may correspond to any type of non-transitory computer-readable medium. In some embodiments, the memory 208 may comprise volatile or non-volatile memory and a controller for the same. Non-limiting examples of memory 212 that may be utilized in the communication device 104A-104C/114A-114C may include RAM, ROM, buffer memory, flash memory, solid-state memory, and/or variants thereof. Any of these memory types may be considered non-transitory computer memory devices even though the data stored thereby can be changed one or more times. In some embodiments, the memory 208 may be configured to store rules and/or the instruction sets depicted in addition to temporarily storing data for the processor 128 to execute various types of routines or functions. The computer memory 208 may store the browser application 220, SIP application 224, scheduling information 228, and/or more information 232 such as registration information for example.

The browser application 220 stored in the computer memory 208 of the communication device 104A-104C/114A-114C may correspond to any application program that provides access to network (e.g., LAN, Internet, World Wide Web, etc.) content. Examples of the browser application 220 may include, but are in no way limited to, Microsoft® Internet Explorer, Microsoft® Edge, Google® Chrome, Mozilla Firefox®, Apple® Safari, and/or the like. In some embodiments, the browser application 220 may run a browser-based application. The browser-based application may run via the manager server 120 and interact with the communication device 104A-104C/114A-114C. In one embodiment, the presentations, interactions, and content described herein may be rendered to the communication device 104A-104C/114A-114C via at least one window and/or page of the browser application 220.

The SIP application 224 stored in the computer memory 208 of the communication device 104A-104C/114A-114C may correspond to an application that, when installed on the communication device 104A-104C/114A-114C, allows the communication device 104A-104C/114A-114C to be used as a SIP client for a VoIP service. Additionally or alternatively, the SIP application 224 may correspond to an application that enables VoIP calling, access to contact lists, access to voicemail, access to scheduled meetings (e.g., via a digital calendar), chat functionality, unified communications, and/or the like, via an extension associated with the user 102/112. The communication device 104A-104C/114A-114C may send and receive SIP messages across the communication network 130 via the SIP application 224 running on the communication device 104A-104C/114A-114C. In one embodiment of the present disclosure, the communication device 104A-104C/114A-114C may send commands, instructions, SIP messages, and/or other messages, for example, across the communication network 130 to at least one of the communication devices 104A-104C/114A-114C directly or indirectly (e.g., via the manager server 120, other servers, etc.).

Additionally, or alternatively, the communication device 104A-104C/114A-114C may receive commands, instructions, SIP messages, and/or other messages from at least one of the communication devices 104A-104C/114A-114C, the manager server 120, other servers, etc. For instance, the user 102/112, via the communication device 104A-104C/114A-114C, may send SIP SCHEDULE messages, and other SIP messages, from the communication device 104A-104C/114A-114C (e.g., to the manager server 120, etc.) when requesting scheduling of the activation or deactivation of one or more features for one or more registered communication device 104A-104C/114A-114C in the communication system 100. One or more of these SIP messages may be sent as part of the SIP application 224 running on the communication device 104A-104C/114A-114C. Data used by the SIP application 224 may be stored locally on the communication device 104A-104C/114A-114C, in the database 150, with the manager server 120, and/or on a voice service (e.g., one or more VoIP carrier servers, databases, systems, etc.). According to alternative embodiments of the present disclosure, other messaging techniques can be used besides SIP messages without departing from spirit and scope of the present disclosure.

The scheduling information may comprise data about the scheduling of the activation and/or deactivation of one or more features of one or more of the communication devices 104A-104C/114A-114C associated with an extension(s) of the user 102/112 in the communication system 100. The scheduling information may include a user identification for the user 102/112, an identification of each communication device 104A-104C/114A-114C associated with the user 102/112, the extension(s) associated with the user 102/112, etc. In some embodiments of the present disclosure, the scheduling information may include authentication information (e.g., access credentials, passwords, etc.). Additionally, the scheduling information may further include scheduled settings for the features of the communication devices 104A-104C/114A-114C for an extension(a) for the user 102/112. Examples of the scheduling information 228 may include, but is in no way limited to, the data described in conjunction with the scheduling data structure 300 of FIG. 3.

In some embodiments of the present disclosure, the communication device 104A-104C/114A-114C may include at least one display device 216 that renders information, applications, windows, interactive elements, and/or other visual output to at least one display screen 236. The communication device 104A-104C/114A-114C may include at least one display controller 212 that controls an operation of the display device 216. This operation may include the control of input (e.g., input provided by the user 102/112 via the user interface 202, command input via the instruction sets in memory 208, and/or combinations thereof, etc.), output (e.g., display, rendered images, window behavior, etc.) and/or other functions of the display device 216 and a display controller 212.

As described above, the display device 216 may comprise at least one display screen 236 that selectively activates pixels and/or display elements to render one or more applications, windows, controls, interactive elements, icons, characters, images, etc. Examples of the display screen 236 may include, but are in no way limited to, a Liquid Crystal Display ("LCD"), a Light Emitting Diode ("LED") display, an Electroluminescent Display ("ELD"), an Organic LED ("OLED") display, and/or some other type of display. In some embodiments of the present disclosure, the display device 216 may be configured to render information in one or more discrete areas (e.g., areas, backgrounds, portions, windows, zones, etc.) of the display screen 236 or superimposed in an area of the display screen 236.

The display device 216 may include a display driver 240, a power supply 244, an input/output 248, and/or other components 252 that enable operation of the display device 216. The display driver 240 may receive commands and/or other data provided by the processor 204 and one or more of the instruction sets in memory 208. In response to receiving the commands, the display driver 240 may generate the driving signals necessary to render the appropriate images to the display screen 236.

The power supply 244 may provide electric power to one or more components of the display device 216. In one embodiment of the present disclosure, the power supply 244 may include a transformer and/or other electronics that prevent overloading, condition power signals, and/or provide backup power to the display device 216. The input/output 248 may correspond to one or more connections for receiving or exchanging information and/or video from components of the communication device 104A-104C/114A-114C (e.g., the processor 204, etc.). The input/output 248 may comprise a high-definition multimedia interface ("HDMI") input, DisplayPort ("DP") input, Ethernet, composite video, component video, H.264, or some other video connection type.

Figure 3:
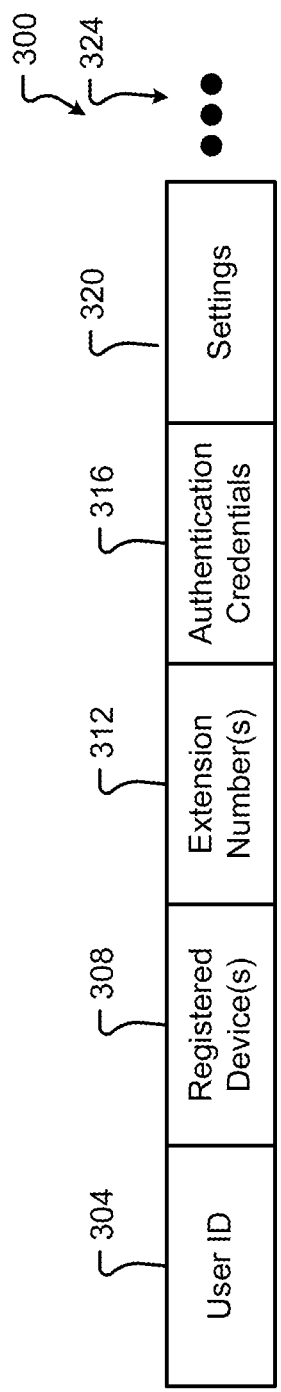
FIG. 3 is a block diagram depicting a communication device scheduling data structure used in accordance with embodiments of the present disclosure.

Referring to FIG. 3, a block diagram depicting a scheduling data structure 300 will be described in accordance with embodiments of the present disclosure. The scheduling data structure 300 may include a number of fields that may be used in the various communication flows, methods, and processes outlined herein. For instance, the scheduling data structure 300 shown may be associated with a particular user 102/112 associated with communication devices 104A-104C/114A-114C, and an extension of the user 102/112. In some embodiments of the present disclosure, the scheduling data structure 300 may be stored in the database 150 and/or the memory 132 of the manager server 120. Information stored in the scheduling data structure 300 may be used by the manager server 120 to determine which features of the registered communication devices 104A-104C/114A-114C associated with an extension(s) of the user 102/112 are to be activated or deactivated at specific times or at certain time intervals. In some embodiments of the present disclosure, the communication device 104A-104C/114A-114C may send a request (e.g., a query message, SIP SCHEDULE message, etc.) to the manager server 120 that requests for the scheduling of the activation and/or deactivation of features for one or more of the registered communication devices 104A-104C/114A-114C. At least some, or even all, the information stored in the scheduling data structure 300 may be provided to the communication device 104A-104C/114A-114C, by the manager server 120, in response to a request made. Examples of the scheduling data structure 300 data fields may include, without limitation, a user identification field 304, a registered device (s) field 308, an extension number(s) field 312, an authentication credentials field 316, a settings field 320 and more 324. More or fewer fields may be provided without departing from the spirit and scope of the present disclosure.

The user identification field 304 may comprise data about the user 102/112. This data may include a name, identifier, email address, employee number, alias, symbol, photo, icon, character, or other string of characters to differentiate one user 102/112 from another in the communication system 100. The manager server 120 may refer to the information in the user identification field 304 to determine associated registered communication devices 104A-104C/114A-114C, extension number, etc.

The registered communication device(s) field 308 may comprise data used to identify or describe a particular communication device 104A-104C/114A-114C from communication devices 104A-104C/114A-114C in the communication system 100 registered to the user 102/112. This identification may be a name, phrase, word, symbol, number, character, and/or combinations thereof. The identification may include an Integrated Circuit Card Identification ("ICCID") number, International Mobile Equipment Identity ("IMEI"), International Mobile Subscriber Identity ("IMSI") number, IP address, MAC address, etc., and/or any other data used to uniquely identify one communication device 104A-104C/114A-114C from another in the communication devices 104A-104C/114A-114C associated with an extension of the user 102/112.

The extension number(s) field 312 may comprise data used to identify or otherwise describe a particular extension of a user 102/112. The extension number may be a number, character, symbol, digits, etc., and/or combinations thereof. In some embodiments of the present disclosure, the extension number may correspond to a typical phone extension number comprising a plurality of digits. As provided above, one or more communication devices 104A-104C/114A-114C may be associated with the extension associated with a user 102/112, and the extension number may be used to uniquely identify the extension of one user 102/112 from another users 102/112 in the communication system 100. In some embodiments of the present disclosure, and as provided by the multiple-device access (MDA) environment, the extension used by each communication device 104A-104C/114A-114C, that is associated with a user 102/112, has the same extension number. Different users have different extensions, and different extension numbers, and each user 102/112 may have one or more communication devices registered with their own extension in the MDA environment and communication system 100. According to an alternative embodiment of the present disclosure, the same user 102/112 may have multiple extensions associated with the communication devices 104A-104C/114A-114C or other communication devices.

The authentication credentials field 316 may comprise data corresponding to stored credentials for the user 102/112, which are associated with the extension of the user 102/112 and/or the registered communication devices 104A-104C/114A-114C of the user 102. These credentials may include passwords, passcodes, keys (e.g., public keys, private keys, etc.), access tokens, and/or any other authentication information used in accessing a communication device 104A-104C/114A-114C and/or an extension (e.g., the extension defined in the extension number field 312 of the scheduling data structure 300, etc.) of the user 102/112.

The settings field 320 may comprise data corresponding to a number of different settings for communication devices 104A-104C/114A-114C. The settings may define specific notification features (e.g., turn ON/OFF ring tone, turn ON/OFF light, turn ON/OFF vibrator, turn ON/OFF mail notification, etc.), specific adjustment features (e.g., adjust (raise/lower) ring tone, adjust light, adjust mail notification, etc.) and specific call features (e.g., call-forwarding, call available, call unavailable, etc.). Examples of other specific call actions may include the call actions provided below in the table without limitation. According to embodiments of the present disclosure, the call features identified above can include a notification action or a separate notification feature can be included with the call feature. For example, Setting X may include the call feature "Call Unavailable" for a particular device at a certain date and time. A separate Setting Y may include the notification feature "Speaker ON" for the device the call has been forwarded to for the same date and time.

TABLE

| Specific Call Features | Explanation |
|---|---|
| Call Available | Signals the user when an incoming call arrives. Different notifications for the incoming call may include a ring tone notification or a vibrator notification. |
| Call Unavailable | Alerts a user that a message is waiting after the user ends the current call by sound, light etc. |
| Audible Message Waiting/ Call Unavailable | Alerts a user with a stutter dial tone, that a message is waiting after the user ends the current call. Voicemail or email service available to retrieve message. |
| Recording | Records telephone conversations after a call is answered and stores the recorded conversation as a message in the voice mailbox of the user. |
| Controlling Authorization Codes | Controls the calling privileges of a user and enhances security for remote access callers (e.g., override a facility's call restriction levels; track call detail recording for cost allocation; provide additional security). |
| Automated Attendant feature | Allows a user to call an extension without the need for an attendant to connect the call. |
| Automatic Callback | Allows a user to be called back when a called device becomes available, when a called telephone was busy or unanswered. |
| Bridge Call | Allows the user to originate, answer and bridge onto call to or from the telephone number of another user. |

TABLE-continued

| Specific Call Features | Explanation |
| --- | --- |
| Call-Forwarding | Allows a user to redirect calls to registered extension and allows a user to redirect calls to an off-network number. |
| Call Park | Allows a user to retrieve a call that has been placed on hold, from any other device within the system. For example, a user can answer a call at one extension, put the call on hold, and then retrieve the call at another extension. Alternatively, the user can answer a call at any device after an attendant or another user pages the user. |
| Call Pickup | Allows a user to answer calls for another user. The Call Pickup feature requires users to be members of the same pickup group (e.g., moving extension to different pickup groups is required). For example, users/extensions in one pickup group can answer calls for users/extensions present in the same pickup group. Moreover, with the Direct Call Pickup feature, where the pickup groups are not required, users can specify other extensions they wish to answer. |

Figure 4A:
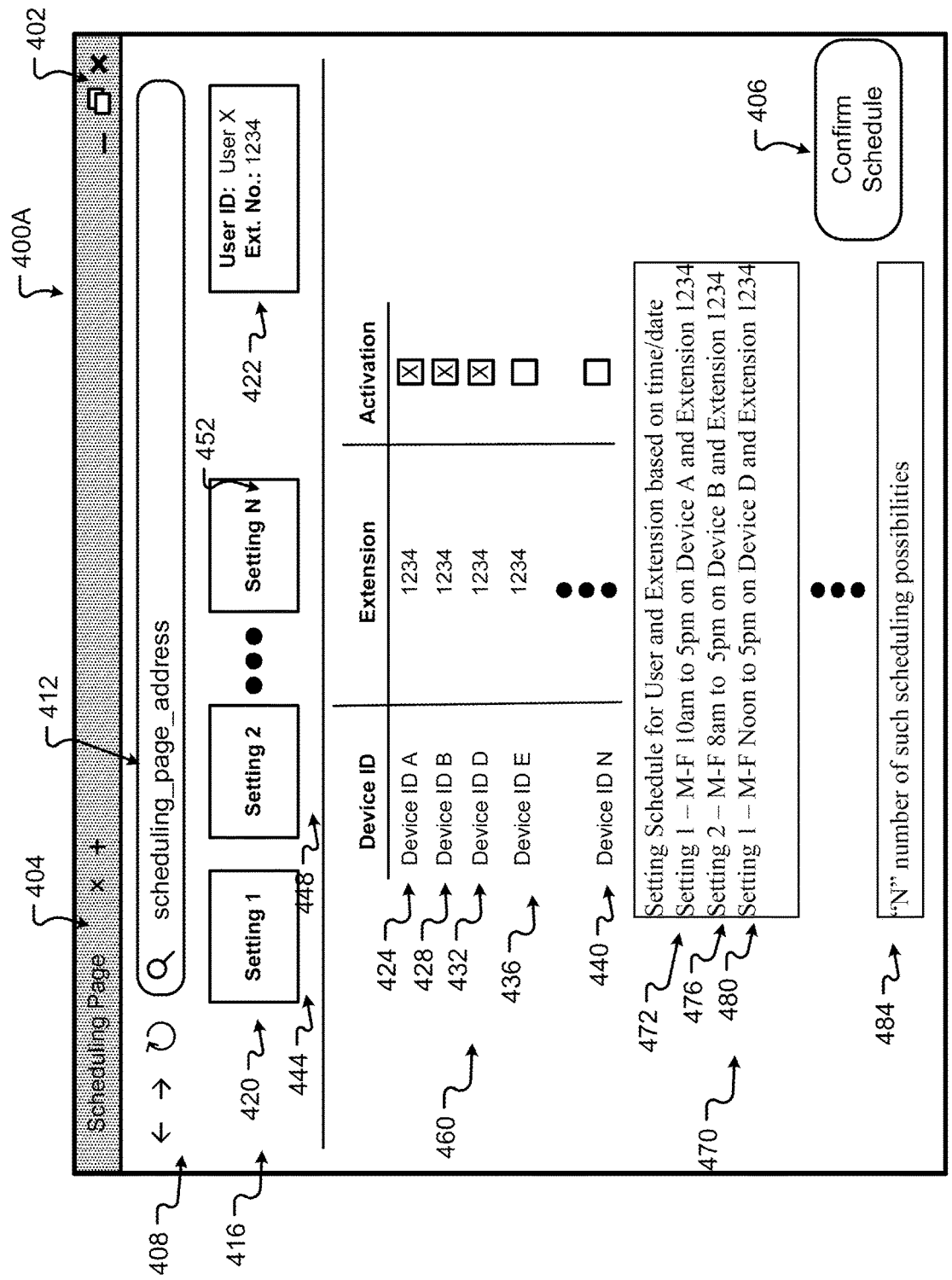
FIG. 4A is a block diagram depicting a first scheduling interface presentation in accordance with embodiments of the present disclosure.
Figure 4B:
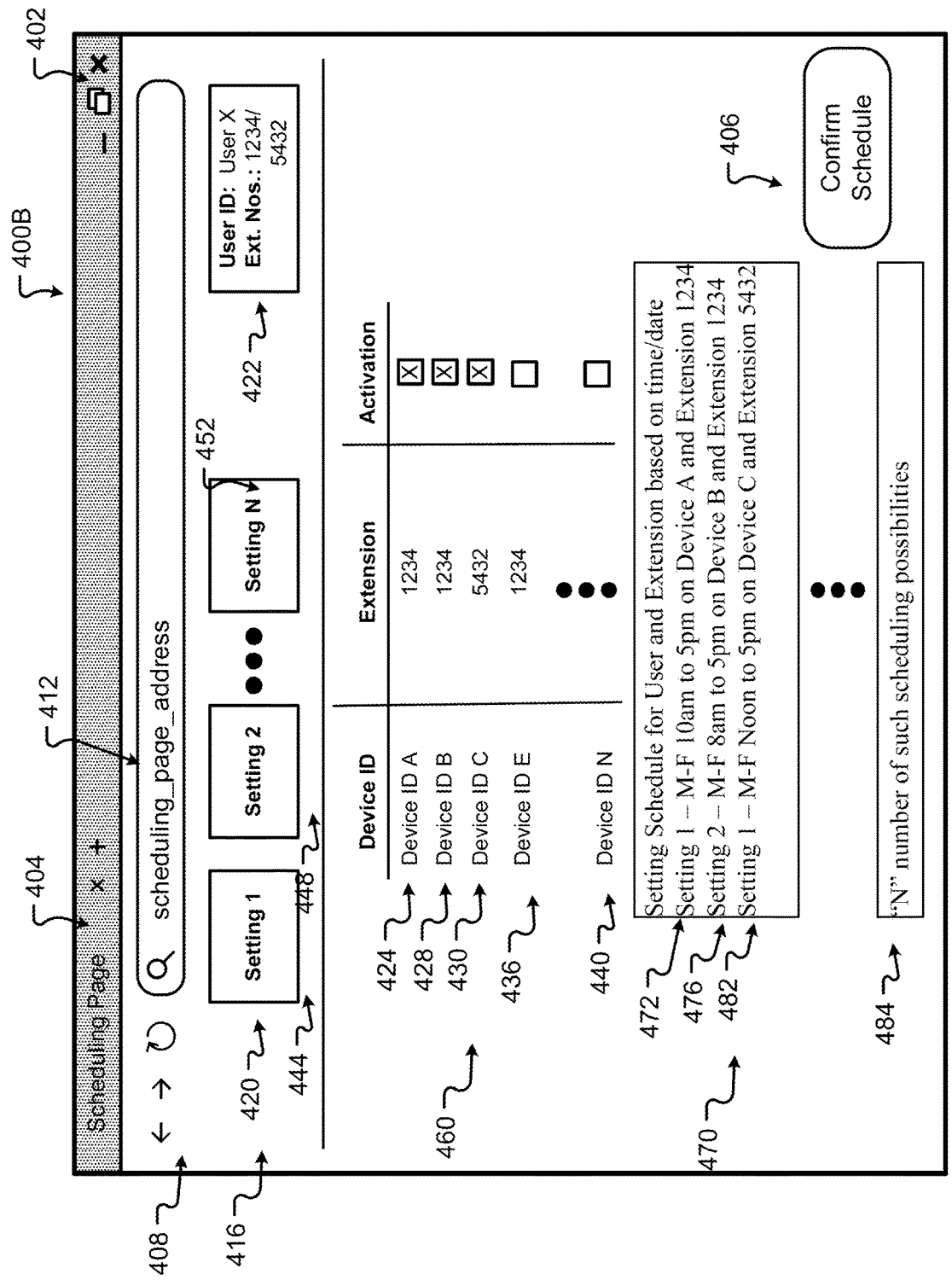
FIG. 4B is a block diagram depicting a second scheduling interface presentation in accordance with embodiments of the present disclosure.
Figure 4C:
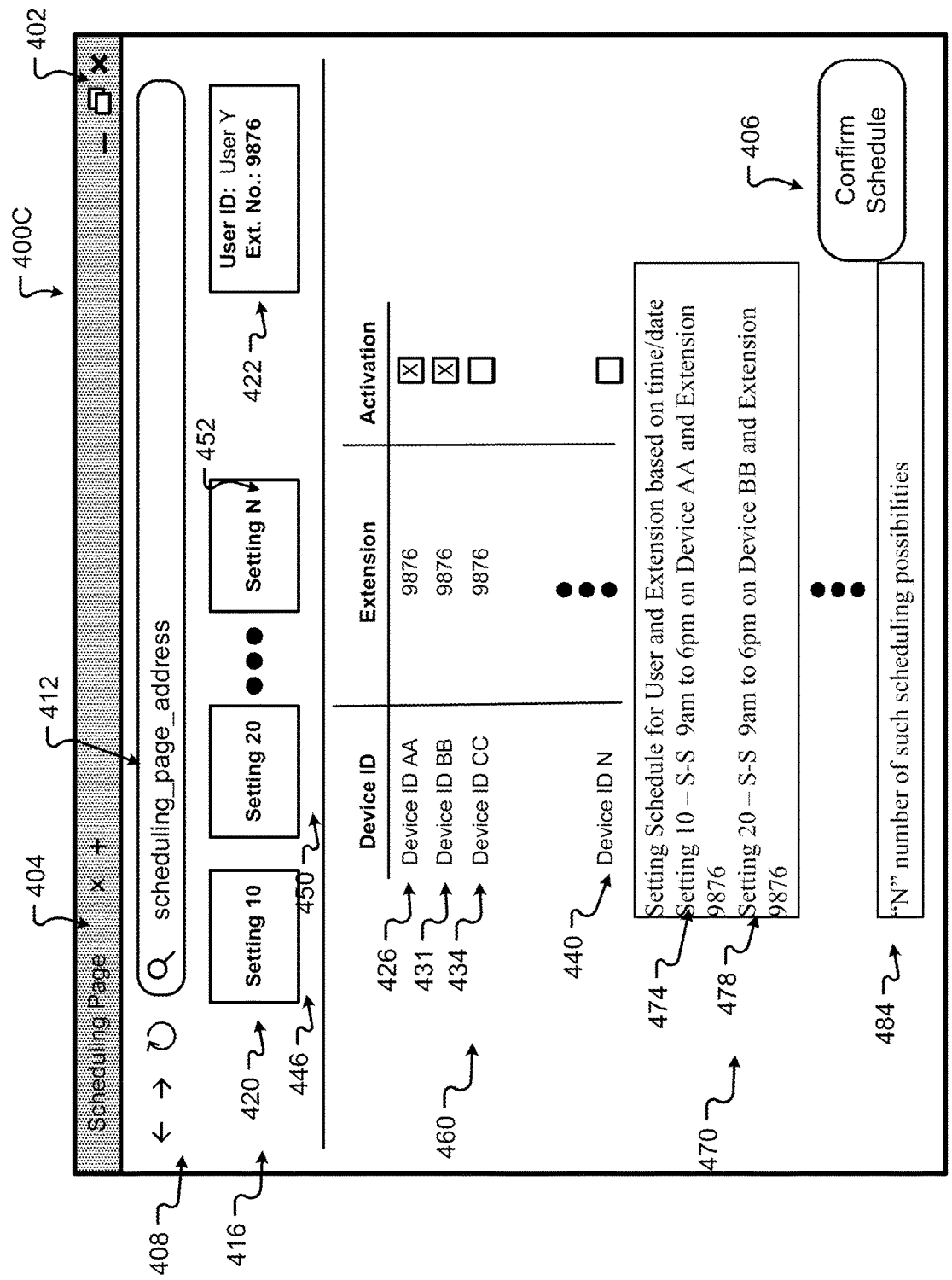
FIG. 4C is a block diagram depicting a third scheduling interface presentation in accordance with embodiments of the present disclosure.

FIGS. 4A-4C show block diagrams of different interactive presentations, or browser application windows 404, rendered by the browser application 220 of the communication device 104A-104C/114A-114C in accordance with embodiments of the present disclosure. Each browser application window 404 may be rendered as part of the browser application 220 to a display device 216 of the communication device 104A-104C/114A-114C. In some embodiments of the present disclosure, the browser application window 404 may include one or more window controls 402, navigation controls 408, address bars 412, and presentation and/or user interaction areas 416. The presentation area 416 may include an area of the browser application window 404 that presents user interface areas (e.g., selection buttons, toggle boxes, text boxes, etc.), information areas, and/or other links to pages other than the address listed in the address bar 412 of the landing page. Although shown partitioned into one or more discrete viewing areas, embodiments of the browser application window 404 are not limited to the arrangements and layout shown in FIGS. 4A-4C. Additionally or alternatively, the information presented by the interface presentations 400A-400C shown in FIGS. 4A-4C may be provided via a pop-up notification, a toast, or other message displayed by the communication device 104A-104C/114A-114C inside or outside of the browser application 220 (e.g., via an OS, or other application of the communication device 104A-104C/114A-114C, etc.).

The one or more window controls 402, when selected, may alter a position, size, or appearance of the browser application window 404. In some embodiments of the present disclosure, these window controls 402 may include icons that, when selected, minimize the browser application window 404 (e.g., shown by the "_" symbol in the upper right-hand portion of the window 404), alter a window size of the browser application window 404 (e.g., shown by the double-rectangle symbol in the upper right-hand portion of the window 404), and close the browser application window 404 (e.g., shown by the "x" symbol in the upper right-hand portion of the window 404).

The browser application window 404 may include an identification of a page that is rendered in the presentation area 416 (e.g., "Scheduling Page," etc.). As provided above, the browser application window 404 may include one or more navigation controls 408. The navigation controls 408 may allow a user 102/112 to navigate to a previous page, navigate to a subsequent page, and/or reload the current page using discrete icons and, in some cases, by providing a single-click selection. The browser application window 404 may include an address bar 412. The address bar 412 may receive an IP address, a website, a network address, and/or some other location on a wired or wireless network (e.g., the communication network 130, etc.). In some embodiments of the present disclosure, the address bar 412 may accept search terms, perform a search of various addresses, sites, and/or the like, and provide results of the search in the browser application window 404.

In FIG. 4A, the first scheduling interface presentation 400A includes the browser application window 404 displaying a scheduling page. As provided above, the first scheduling interface presentation 400A may be rendered to display device 216 of one of the communication devices 104A-104C/114A-114C. The presentation area 416 of the scheduling page may include a scheduling settings area 420 including a number of settings 444-452, an identification area 422, a device listing area 460 having a number of communication device detail rows 424-440, a scheduling area 470 including a number of scheduling rows 472-484 and a confirm schedule selection button 406. The number of settings 444-452 may include "Setting 1" which provides the feature "No ring on the device and notification after call." Setting 2 may provide the feature(s) "Ringer Volume-OFF Vibrate-ON." More setting 452 may be presented for additional features for communication devices 104A-104C/114A-114C that are registered with the extension(s) of the user 102/112.

The identification area 422 may include the identity of a user 102/112 (e.g., from the user identification field 304 of the scheduling data structure 300, etc.) and the extension number (e.g., from the extension number(s) field 312 of the scheduling data structure 300, etc.). As illustrated in FIG. 4A, the user 102/112 is identified as "User X" and the extension for the user 102/112 is identified as extension number "1234." According to an alternative embodiment of the present disclosure, interface presentation 400A may include an identification area 422 that provides for multiple extension numbers for a single user 102/112 as discussed in greater detail below.

The device listing area 460 includes a number of communication device detail rows 424-440 arranged as part of a table, or list. This table may include the identification of each communication device 104A-104C/114A-114C listed (e.g., "Device ID"), the extension associated with each communication device 104A-104C/114A-114C listed (e.g., "Extension") and an activation selection option (e.g., "Activation") in the form of a selection box, button, toggle switch, etc., and/or combinations thereof. The activation selection option associated with each row 424-440 may selectively and, in some cases, independently allow a user 102/112 to provide an input to activate one or more of the communication devices 104A-104C/114A-114C listed. The activated selection option, provided as an activation selection check box, or activation selection option button, is configured to receive and record an input from a user 102/112, when selected. For instance, a user 102/112 may select the activation selection check box by providing a selection input (e.g., clicking, or touching, etc.) within the border of a respective activation selection check box. In one embodiment, the user 102/112 may provide the selection input via the user interface 202 of the communication device 104A-104C/114A-114C.

The device listing 460 shows this detailed information listed in a first communication device detail row 424 (e.g., for "Device ID A"—"Extension 1234" and "Activated"), a second communication device detail row 428 (e.g., for "Device ID B"—"Extension 1234" and Activated), a third communication device detail row 432 (e.g., for "Device ID D"—"Extension 1234" and "Activated") and a fourth communication device detail row 436 (e.g., for "Device ID E"—"Extension 1234" and "Not Activated"). More communication device detail rows 440 may be presented for additional communication devices (e.g., "Device ID N") that are registered with the extension(s) of the user 102/112. In some embodiments of the present disclosure, "Device ID A" may correspond to the first communication device 104A, "Device ID B" may correspond to the second communication device 104B and "Device ID D" may correspond to the third communication device 104C.

The scheduling area 470 includes the schedules for the communication devices 104A-104C/114A-114C along with the settings 444-452 also listed, as entered by the user 102/112 and arranged as part of a table, or list. The table shows this detailed information listed in a first scheduling row 472 which provides the setting number, the day of the week, the time interval, the device and the extension and provides the following: (e.g., "Setting 1—Monday through Friday (M-F) 10:00 a.m. to 5:00 p.m. Device A and Extension 1234"). A second scheduling row 476 provides the following: (e.g., "Setting 2—M-F 8:00 a.m. to 5:00 p.m. on Device B and Extension 1234"). A third scheduling row 480 provides the following: (e.g., "Setting 1—M-F Noon to 5:00 p.m. on Device D and Extension 1234"). More scheduling rows 484 may be presented for additional scheduling for communication devices 104A-104C/114A-114C that are registered with the extension(s) of the user 102/112.

The confirm schedule selection button 406 may be rendered as part of the browser application window 404 that allows the user 102/112 to confirm the entered schedule. Before confirming the entered schedule, the user 102/112 may be prompted to check to make sure the schedule is accurate. According to an alternative embodiment of the present disclosure, the schedule could be read out to the user 102/112 before the user 102/112 selects the confirm schedule selection button 406.

Additionally, or alternatively, the scheduling area 470 may include one or more messages, images, instructions, and/or other content that is presented to the user 102/112 of the communication device 104A-104C/114A-114C or other device, to select a registered device(s) and schedule feature(s) activation and/or deactivation for a selected device(s).

FIG. 4B shows a second scheduling interface presentation 400B. Like the first scheduling interface presentation 400A, the second scheduling interface presentation 400B includes the presentation area 416 including the scheduling settings area 420 including a number of settings 444-452, the identification area 422, the device listing area 460 having a number of communication device detail rows 424-440, and the scheduling area 470 including a number of scheduling rows 472-484. The number of settings 444-452 may include "Setting 1" which provides the feature "No ring on the device and notification after call." Setting 2 may provide the feature(s) "Ringer Volume-OFF Vibrate-ON." More settings 452 may be presented for additional features for communication devices 104A-104C/114A-114C that are registered with the extension(s) of the user 102/112.

The identification area 422 may include the identity of a user 102/112 (e.g., from the user identification field 304 of the scheduling data structure 300, etc.) and the extension number (e.g., from the extension number(s) field 312 of the scheduling data structure 300, etc.). As illustrated in FIG. 4B, the user 102/112 is identified as "User X" and the extensions for the user 102/112 are identified as extension number "1234" and extension number "5432."

The device listing area 460 includes a first communication device detail row 424 (e.g., for "Device ID A"—"Extension 1234" and "Activated"), a second communication device detail row 428 (e.g., for "Device ID B"—"Extension 1234" and Activated), a third communication device detail row 430 (e.g., for "Device ID C"—"Extension 5432" and "Activated") and a fourth communication device detail row 436 (e.g., for "Device ID E"—"Extension 1234" and "Not Activated"). More communication device detail rows 440 may be presented for additional communication devices (e.g., "Device ID N") that are registered with the extension(s) of the user 102/112.

The scheduling area 470 includes the schedules for the communication devices 104A-104C/114A-114C along with the settings 444-452 also listed and arranged as part of a table, or list. The table shows this detailed information listed in a first scheduling row 472 which provides the setting number, the day of the week, the time interval, the device and the extension and provides the following: (e.g., "Setting 1—Monday through Friday (M-F) 10:00 a.m. to 5:00 p.m. Device A and Extension 1234"). A second scheduling row 476 provides the following: (e.g., "Setting 2—M-F 8:00 a.m. to 5:00 p.m. on Device B and Extension 1234"). A third scheduling row 482 provides the following: (e.g., "Setting 1—M-F Noon to 5:00 p.m. on Device C and Extension 5432"). More scheduling rows 484 may be presented for additional scheduling for communication devices 104A-104C/114A-114C that are registered with the extension(s) of the user 102/112.

FIG. 4C shows a third scheduling interface presentation 400C. Like the first and second scheduling interface presentations 400A and 400B, respectively, the third scheduling interface presentation 400C includes the presentation area 416 including the scheduling settings area 420, the identification area 422, the device listing area 460 and the scheduling area 470. The number of settings 446-452 may include "Setting 10" which provides the feature "Call-forwarding of calls from office to home." Setting 20 may provide the feature "Speaker On." More settings 452 may be presented for additional features for communication devices 104A-104C/114A-114C that are registered with the extension(s) of the user 102/112.

The identification area 422 may include the identity of a user 102/112 (e.g., from the user identification field 304 of the scheduling data structure 300, etc.) and the extension number (e.g., from the extension number(s) field 312 of the scheduling data structure 300, etc.). As illustrated in FIG. 4C, the user 102/112 is identified as "User Y" and the extension for the user 102/112 is identified as extension number "9876."

The device listing area 460 includes a first communication device detail row 426 (e.g., for "Device ID AA"—"Extension 9876" and "Activated"), a second communication device detail row 431 (e.g., for "Device ID BB"—"Extension 9876" and Activated) and a third communication device detail row 434 (e.g., for "Device ID CC"—"Extension 9876" and "Not Activated"). More communication device detail rows 440 may be presented for additional communication devices (e.g., "Device ID N") that are registered with the extension(s) of the user 102/112.

The scheduling area 470 includes the schedules for the communication devices 104A-104C/114A-114C along with the settings 446-452 also listed and arranged as part of a table, or list. The table shows this detailed information listed in a first scheduling row 474 which provides the setting number, the day of the week, the time interval, the device and the extension and provides the following: (e.g., "Setting 10—Saturday and Sunday (S-S) 9 a.m. to 6:00 p.m. Device AA and Extension 9876"). A second scheduling row 478 provides the following: (e.g., "Setting 20—S-S 9:00 a.m. to 6:00 p.m. on Device BB and Extension 9876"). More scheduling rows 484 may be presented for additional scheduling for communication devices 104A-104C/114A-114C that are registered with the extension(s) of the user 102/112.

Although the scheduling interactive presentations illustrated in FIGS. 4A-4C are rendered by the browser application 220 of the communication devices 104A-104C/114A-114C, the scheduling interactive presentations can be rendered from a browser application on any device other than the communication devices or the scheduling interactive presentations illustrated in FIGS. 4A-4C may be generated from the SIP application 224 of the communication device 104A-104C/114A-114C without departing from the spirit and scope of the present disclosure.

Figure 5:
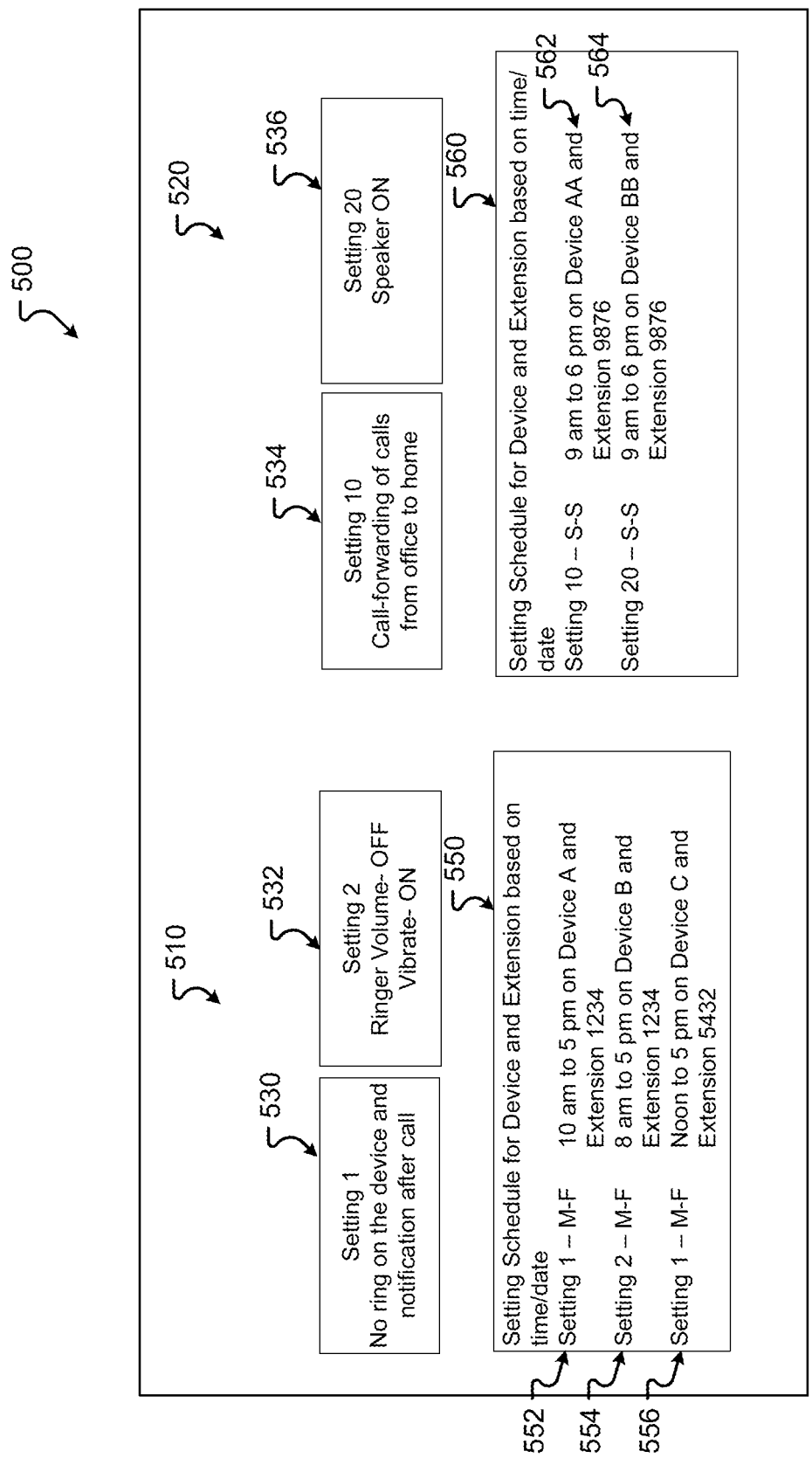
FIG. 5 is a block diagram depicting scheduling data structures stored for users used in accordance with embodiments of the present disclosure.

FIG. 5 is a block diagram 500 depicting scheduling data structures 510 and 520 stored for users 102/112 used in accordance with embodiments of the present disclosure. The scheduling data structures 510 and 520 include data entered by the user 102/112 as described in FIGS. 4A-4C and transmitted and stored in memory 132 of manager server 120 and/or database 150. As depicted, scheduling data structure 510 includes settings 530 and 532 and a scheduling area 550 including a number of scheduling rows 552, 554 and 556. Setting 530 provides "Setting 1 No ring on the device and notification after call" and Setting 532 provides "Setting 2 Ringer Volume-OFF Vibrate-ON." The scheduling area 550 includes scheduling row 552 which provides "Setting 1—M-F 10:00 a.m. to 5:00 p.m. Device A and Extension 1234." Scheduling row 554 provides "Setting 2—M-F 8:00 a.m. to 5:00 p.m. on Device B and Extension 1234." Scheduling row 556 provides "Setting 1—M-F Noon to 5:00 p.m. on Device C and Extension 5432." The scheduling data structure 510 includes substantially the same data described in the scheduling settings area 420 and the scheduling area 470 illustrated in FIG. 4B entered and confirmed by the user 102/112.

Scheduling data structure 520 includes settings 534 and 536 and a scheduling area 560 including a number of scheduling rows 562 and 564. Setting 534 provides "Setting 10 Call-forwarding of calls from home to office" and Setting 536 provides "Setting 20 "Speaker ON." The scheduling area 560 includes scheduling row 562 which provides "Setting 10—S-S 9 a.m. to 6:00 p.m. Device AA and Extension 9876." Scheduling row 564 provides "Setting 20—S-S 9:00 a.m. to 6:00 p.m. on Device BB and Extension 9876." The scheduling data structure 520 includes substantially the same data described in the scheduling settings area 420 and the scheduling area 470 illustrated in FIG. 4C entered and confirmed by the user 102/112.

For each of the scheduling data structures 510 and 520, the manager server 120 is automatically deciding/pushing a profile of the user's choice to a registered communication device (e.g., Device A) with an extension (e.g., Extension 1234) at a particular time based on the user's entered schedule. At the same time, the manager server 120 is also making call related decisions for the extension/device based on the user preferences provided in the entered schedule. For example, if a feature on a registered communication device 104A-104C/114A-114C has been manually set (e.g., vibrator turned ON) which conflicts with a scheduled feature for the registered communication device 104A-104C/114A-114C, the manager server 120 can send a message to at least one of the communication device(s) 104A-104C/114A-114C requesting to override the manually set feature, automatically override the manually set feature in favor of the scheduled feature for the communication device 104A-104C/114A-114C, or retrieve a system administrator provided rule for conflict resolution.

Figure 6:
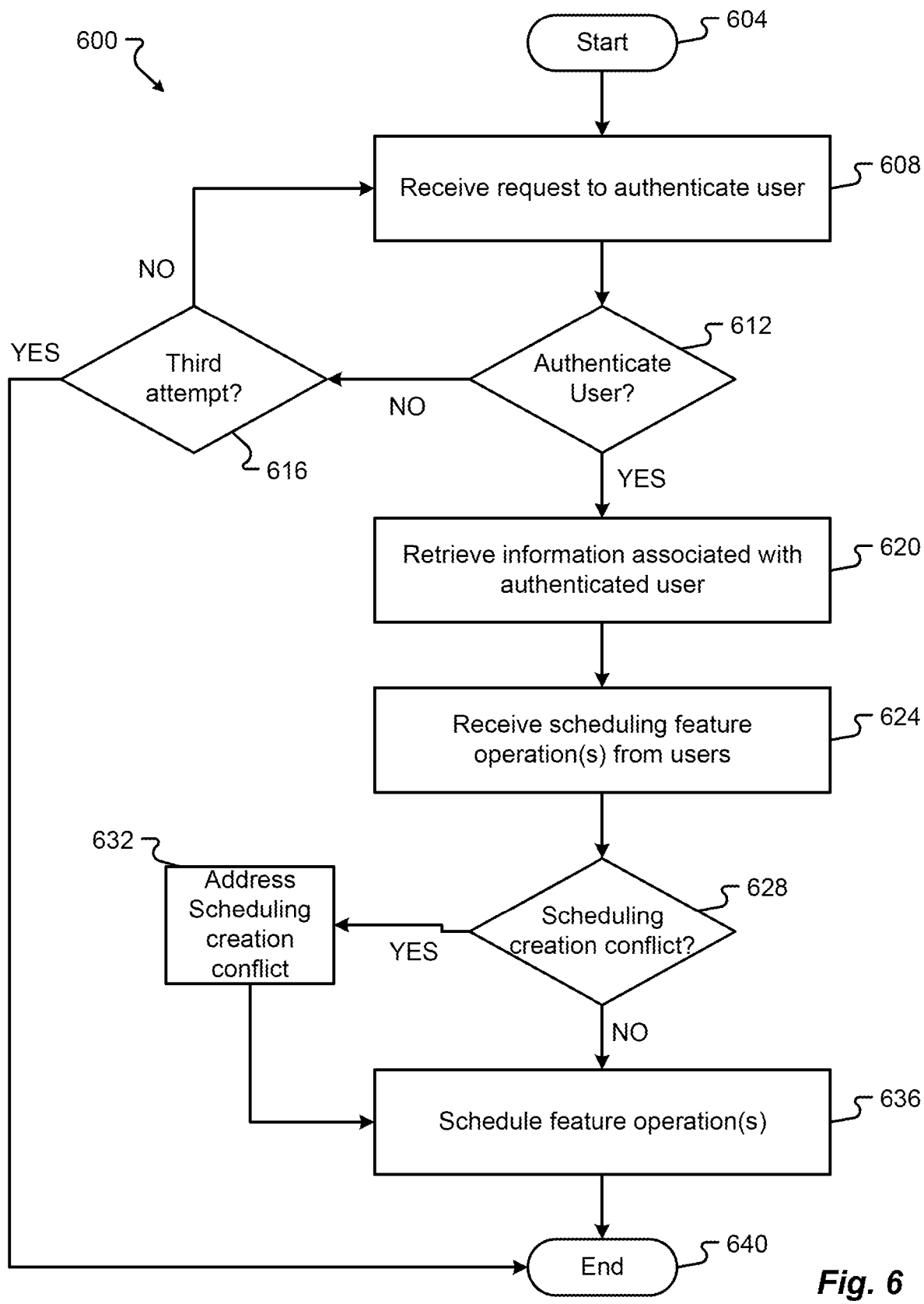
FIG. 6 is a flow diagram depicting a method for scheduling feature activation and deactivation for communication devices in a multiple-device access environment in accordance with embodiments of the present disclosure.

FIG. 6 is a flow diagram depicting a method 600 for scheduling feature activation and deactivation for registered communication devices 104A-104C/114A-114C in a multiple-device access environment in accordance with embodiments of the present disclosure. While a general order of the steps of method 600 is shown in FIG. 6, method 600 can include more or fewer steps or can arrange the order of the step differently than those shown in FIG. 6. Further, two or more steps may be combined in one step. Generally, the method 600 starts at START operation at step 604 and ends with an END operation at step 640. The method 600 can be executed as a set of computer-executable instructions (e.g., communication instructions, scheduling instructions 144, interaction instructions 148, etc.) executed by a computer system (e.g., the manager server 120, the processor 128, etc.) and encoded or stored on a computer readable medium (e.g., memory 132, etc.). Hereinafter, the method 600 shall be explained with reference to the systems, components, modules, applications, software, data structures, user interfaces, etc. described in conjunction with FIGS. 1-5.

Method 600 begins at step 604 and proceeds to step 608, where the processor 128 of the manager server 120 receives a query message requesting to authenticate a user wanting to log onto the website of the scheduling page. A user 102/112 can be authenticated in a number of ways including, but not limited to, correctly entered access credentials, passwords, passcodes, keys (e.g., public keys, private keys, etc.), access tokens, and/or any other authentication information previously stored in authentication credentials field 316 of scheduling data structure 300. After the processor 128 of the manager server 120 receives the query message requesting to authenticate a user at step 608, method 600 proceeds to decision step 612 where the processor 128 of the manager server 120, determines if the user has been authenticated. Authenticating the user may include matching one or more items stored in the authentication credentials field 316 with entered item(s) by the user 102/112 seeking to access the scheduling page.

If the user 102/112 has been authenticated at decision step 612 (YES), method 600 proceeds to step 620, where the processor 128 of the manager server 120 retrieves information associated with the user 102/112, provided in the fields of the scheduling data fields 300 stored in the memory 132 or the database 150 and generates the scheduling page. This information includes, but not limited to, the user ID 304, a list of registered device(s) 308, extension number(s) 312 and a list of available settings 320 available to the user 102/112. If the user 102/112 has not been authenticated at decision step 612 (NO), method 600 proceeds to decision step 616 where the processor 128 of the manager server 120 determines if this is the third unsuccessful attempt at authorization.

Although method 600 indicates three unsuccessfully attempts, any number of unsuccessful attempts can be used for example, without departing from the spirit and scope of the present disclosure. If this is not the third unsuccessful attempt at authorization (NO) at decision step 616, method 600 returns to step 608, where the user 102/112 is given several more attempts (e.g., two more attempts) to supply the correct authenticating information. If this is the third unsuccessful attempt at authorization (YES) at decisions step 616, method 600 ends with the END operation at step 640. After retrieving the information associated with the user 102/112 and generating the scheduling page at step 620, method 600 proceeds to step 624 where the processor 128 of the manager server 120 receives scheduling information from the user 102/112. The scheduling information may include selection of one or more settings provided in the scheduling settings area 420, activation of one or more registered communication devices 104A-104C/114A-114C provided in the device listing area 460 and entry of a schedule to the one or more activated registered communication devices provided in the scheduling area 470. Each of the settings area 420, device listing area 460 and the scheduling area 470 is illustrated in FIGS. 4A-4C.

After receiving scheduling information from the user 102/112 at step 624, method 600 proceeds to decision step 628, where the processor 128 of the manager server 120 determines if there is a scheduling creation conflict. A scheduling creation conflict may arise between a current schedule entry for a future action and a previously scheduled entry for the same or an overlapping action. For example, a previously scheduled entry could require a communication device 104A-104C/114A-114C to turn ON the speaker feature Monday through Friday from 9:00 am to 5 pm and a current schedule entry could require the communication device 104A-104C/114A-114C to turn OFF the speaker feature on Tuesdays and Thursdays from 2:00 pm to 3:00 pm. Upon entering the current schedule entry, the processor 128 of the manager server 120 would automatically provide an alert to the user 102/112 that there is a scheduling creation conflict. If there is at least one scheduling creation conflict at decision step 628 (YES), method 600 proceeds to step 632 where the processor 128 of the manager server 120 addresses the scheduling creation conflict with the user 102/112.

Addressing the scheduling creation conflict with the user 102/112 may include receiving a deletion of the current schedule entry, receiving a deletion of the previously scheduled entry, receiving a modification of the current schedule entry, and/or receiving a modification of the previously scheduled entry to correct the scheduling creation conflict. Alternatively, addressing the scheduling creation conflict with the user 102/112 may include granting the processor 128 of the manager server 120 permission to override either the previously scheduled entry or the current schedule entry.

According to further embodiments of the present disclosure, for mutually exclusive settings having the same or overlapping schedules, the processor 128 of the manager server 120 can determine whether or not a scheduling creation conflict exists. For example, if setting A "No ring tone" is scheduled for Monday through Friday all day and setting B "Call-forwarding" is scheduled for Monday through Friday all day, then there would not be any scheduling creation conflict since these settings are mutually exclusive of each other.

After addressing the scheduling creation conflict with the user 102/112 at step 632, method 600 proceeds to step 636 where the processor 128 of the manager server 120 schedules the feature operation(s). If the processor 128 of the manager server 120 determines that there are no scheduling creation conflicts at decision step 628 (NO), method 600 likewise proceeds to step 636 where the processor 128 of the manager server 120 schedules the feature operation(s). According to embodiments of the present disclosure, the processor 128 of the manager server 120 schedules the feature operation(s) after the user 102/112 confirms the schedule by selecting confirm schedule selection button 406. After scheduling the feature operation(s) at step 636, method 600 ends with END operation at step 640.

Figure 7:
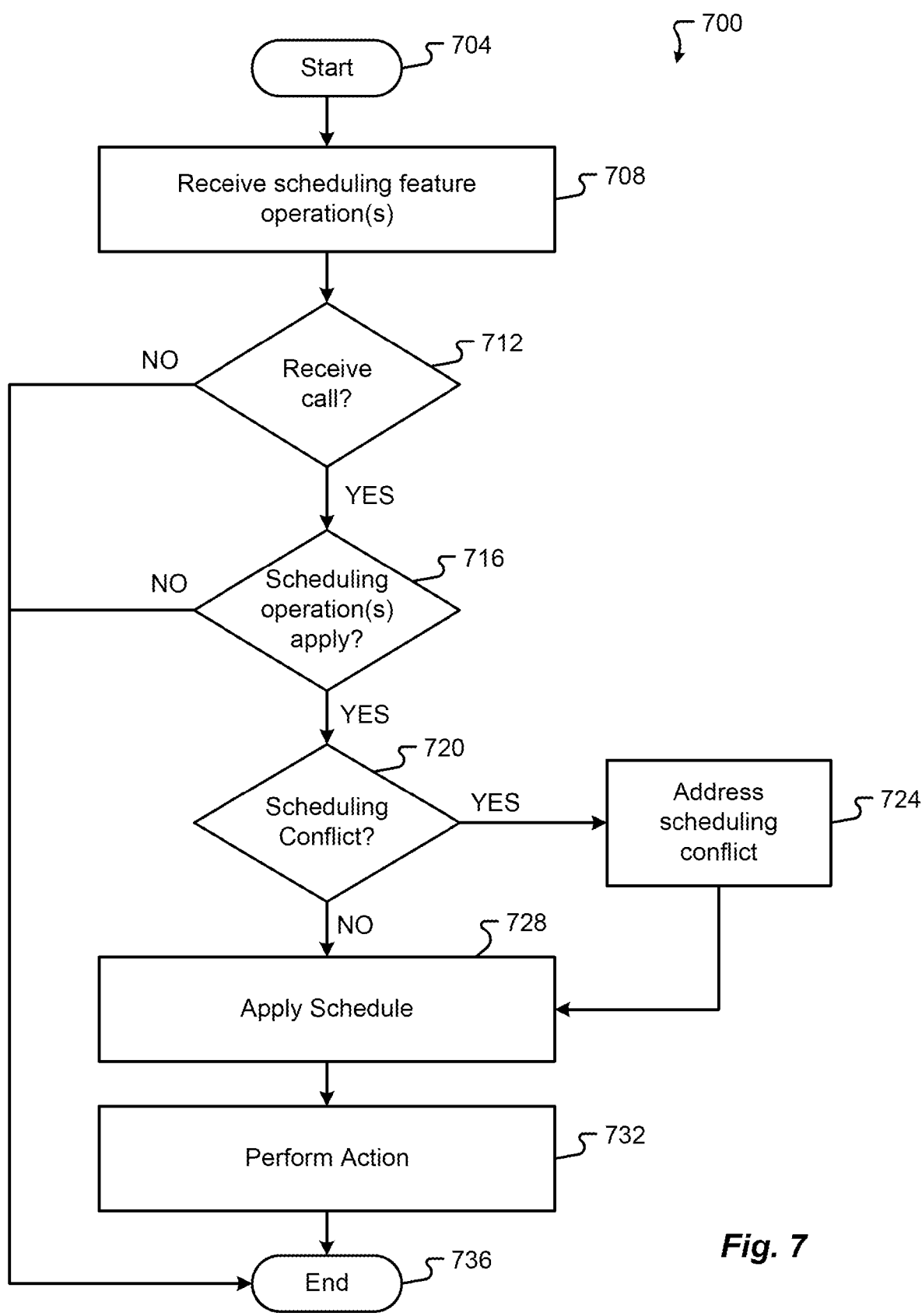
FIG. 7 is a flow diagram depicting a method for handling incoming calls for communication devices in a multiple-device access environment utilizing scheduling feature activation and deactivation in accordance with embodiments of the present disclosure.

FIG. 7 is a flow diagram depicting a method 700 for handling incoming calls for communication devices 104A-104C/1114A-114C in a multiple-device access environment utilizing scheduling feature activation and deactivation in accordance with embodiments of the present disclosure. While a general order of the steps of method 700 is shown in FIG. 7, method 700 can include more or fewer steps or can arrange the order of the step differently than those shown in FIG. 7. Further, two or more steps may be combined in one step. Generally, the method 700 starts at START operation at step 704 and ends with an END operation at step 736. The method 700 can be executed as a set of computer-executable instructions (e.g., communication instructions, scheduling instructions 144, interaction instructions 148, etc.) executed by a computer system (e.g., the manager server 120, the processor 128, etc.) and encoded or stored on a computer readable medium (e.g., memory 132, etc.). Hereinafter, the method 700 shall be explained with reference to the systems, components, modules, applications, software, data structures, user interfaces, etc. described in conjunction with FIGS. 1-5.

Method 700 begins at step 704 and proceeds to step 708, where the processor 128 of the manager server 120 receives the scheduling feature operation(s). According to embodiments of the present disclosure, the received scheduling feature operation(s) of step 708 are substantially similar to the received scheduling feature operation(s) of step 624 in FIG. 6. Moreover, the received scheduling feature operation(s) of step 708 may further include the results from the address scheduling creation conflict step 632 in FIG. 6.

After the processor 128 of the manager server 120 receives the scheduling feature operation(s) at step 708, method 700 proceeds to decision step 712 where the processor 128 of the manager server 120 determines if a call has been received from a third-party over the communication network 130. If the processor 128 of the manager server 120 determines that no call has been received from a third-party over the communication network 120 (NO) at decision step 712, method 700 ends with END operation at step 736. The processor 128 of the manager server 120 determining that no call has been received from a third-party over the communication network 130 means that no call has been received during the time the scheduling feature operation(s) are in effect (e.g., the date, the time and/or the date and time for the scheduling feature operation(s) have expired).

If the processor 128 of the manager server 120 determines that a call has been received from a third-party over the communication network 130 (YES) at decision step 712, method 700 proceeds to decision step 716, where the processor 128 of the manager server 120 determines if any of the scheduling feature operation(s) apply to the received call. If no scheduling feature operation(s) apply to the received call at decision step 716 (NO), method 700 ends with END operation at step 736. The processor 128 of the manager server 120 determining that no scheduling feature operation(s) apply means no scheduling feature operation(s) apply during the time the scheduling feature operation(s) are in effect (e.g., the date, the time and/or the date and time for the scheduling feature operation(s) have expired).

If at least one scheduling feature operation applies to the received call at decision step 716 (YES), method 700 proceeds to decision step 720, where processor 128 of the manager server 120 determines if a scheduling conflict exists. Unlike or in addition to the scheduling creation conflict decision step 628 in FIG. 6, scheduling conflict decision step 720 compares feature(s) manually set on at least one of the communication devices 104A-104C/114A-114C with a scheduled feature operation(s). If the processor 128 of the manager server 120 determines that a scheduling conflict exists at decision step 720 (YES), method 700 proceeds to step 724 where the processor 128 of the manager server 120 alerts the user 102/112 of the scheduling conflict to resolve the scheduling conflict.

According to one embodiment of the present disclosure, resolution of the scheduling conflict may include canceling or modifying one of the manually set feature operations(s) or the scheduled feature operation(s) or canceling both of the manually set feature operation(s) and the scheduled feature operation(s). According to a further embodiment of the present disclosure, the processor 128 of the manager server 120 will override any scheduling conflicts in favor of the scheduled feature operation(s). As stated above, if the manually set feature operation(s) and the scheduled feature operation(s) are mutually exclusive of each other, then processor 128 of the manager server 120 may determine that no scheduling conflict exists.

After addressing the scheduling conflict at step 724, method 700 proceeds to step 728 where the processor 128 of the manager server 120 applies the scheduled feature operation(s) to the received incoming call(s). If the processor 128 of the manager server 120 determines that there are no scheduling conflicts at decision step 720 (NO), method 700 likewise proceeds to step 728 where the processor 128 of the manager server 120 applies the scheduled feature operation(s) to the received incoming call(s). After the processor 128 of the manager server 120 applies the scheduled feature operation(s) to the received incoming call(s) at step 728, the processor 128 of the manager server 120 and the communication device(s) 104A-104C/114A-114C to which the scheduled feature operation(s) are applied, perform the action(s) of the scheduled feature operation(s). In other words, the scheduling feature operation(s) modify the behavior of the communication device(s) 104A-104C/114A-114C to which the scheduled feature operation(s) are applied. After the processor 128 of the manager server 120 and the communication device(s) 104A-104C/114A-114C to which the scheduled feature operation(s) are applied perform the action(s) of the scheduled feature operation(s) at step 732, method 700 ends with END operation at step 736. Method 700 ends only if the date, the time and/or the date and time for the scheduling feature operation(s) have expired.

Any of the steps, functions, and operations discussed herein can be performed continuously and automatically.

The exemplary systems and methods of this disclosure have been described in relation to communication devices, multiple-device access environments, and communication systems. However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should, however, be appreciated that the present disclosure may be practiced in a variety of ways beyond the specific detail set forth herein. For instance, while described in conjunction with client-server networks (e.g., conferencing servers, client devices, etc.), it should be appreciated that the components, systems, and/or methods described herein may be employed as part of a peer-to-peer network or other network. As can be appreciated, in a peer-to-peer network, the various components or systems described in conjunction with the communication system 100 may be part of one or more endpoints, or computers, participating in the peer-to-peer network.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined into one or more devices, such as a server, communication device, or collocated on a particular node of a distributed network, such as an analog and/or digital telecommunications network, a packet-switched network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

While the flowcharts have been discussed and illustrated in relation to a particular sequence of events, it should be appreciated that changes, additions, and omissions to this sequence can occur without materially affecting the operation of the disclosed embodiments, configuration, and aspects.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and/or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

Embodiments of the present disclosure include a method for scheduling feature operations on a remote server to modify a behavior of at least one communication device of a plurality of communication devices includes receiving, by the remote server, an entry for at least one feature operation for the at least one communication device of the plurality of communication devices registered with a same extension. The entry includes a scheduled date and a scheduled time for the at least one feature operation. The method also includes processing, by the remote server, the entry to determine how to handle an incoming call during the scheduled date and the scheduled time for the at least one feature operation. The method further includes generating, by the remote server, a scheduled feature operation for the entry and modifying, by the remote server, the behavior of the at least one communication device based on the scheduled feature operation.

Aspects of the above method include wherein the at least one feature operation includes activating call-forwarding for the at least one communication device to forward the incoming call from the at least one communication device to another of the plurality of communication devices registered with the same extension for the scheduled date and the scheduled time.

Aspects of the above method include wherein the at least one feature operation includes activating call unavailable for the at least one communication device to direct the incoming call to a messaging service for the scheduled date and the scheduled time.

Aspects of the above method include wherein the at least one feature operation includes activating call available for the at least one communication device and changing a ring tone notification to a vibrator notification.

Aspects of the above method include wherein processing the entry to determine how to handle the incoming call includes overriding any previously scheduled feature operation that conflicts with the at least one feature operation at an overlapping scheduled date and scheduled time.

Aspects of the above method include wherein processing the entry to determine how to handle the incoming call includes not overriding any previously scheduled operation that is mutually exclusive with the at least one feature operation at an overlapping scheduled date and scheduled time.

Aspects of the above method include wherein processing the entry to determine how to handle the incoming call includes retrieving a system administer rule for conflict resolution for any previously scheduled feature operation that conflicts with the at least one feature operation at an overlapping scheduled date and scheduled time.

Aspects of the above method further incudes further authenticating, by the remote server, a user of the at least one communication device, before receiving the entry containing the at least one feature operation.

Aspects of the above method include alerting, by the remote processor, the user of any scheduling creation conflict between any previously scheduled feature operation and the at least one feature operation at an overlapping scheduled date and scheduled time.

Aspects of the above method include alerting, by the remote processor, the user of any scheduling creation conflict between any feature operation entered on the at least one communication device and the at least one feature operation at an overlapping scheduled date and scheduled time.

Aspects of the above method include wherein processing entry to determine how to handle the incoming call includes overriding any feature operation entered on the at least one communication device that conflicts with the at least one feature operation at an overlapping scheduled date and scheduled time.

Embodiments of the present disclosure include a system for scheduling feature operations on a remote server to modify a behavior of at least one communication device of a plurality of communication devices, including a memory and at least one processor of the remote server, coupled to the memory, operative to: receive an entry for at least one feature operation for the at least one communication device of the plurality of communication devices registered with a same extension, wherein the entry includes a scheduled date and a scheduled time for the at least one feature operation; process the entry to determine how to handle an incoming call during the scheduled date and the scheduled time for the at least one feature operation; generate a scheduled feature operation for the at least one feature operation; and modify the behavior of the at least one communication device based on the scheduled feature operation.

Aspects of the above system include wherein the at least one feature operation includes activating call-forwarding for the at least one communication device to forward the incoming call from the at least one communication device to another of the plurality of communication devices registered with the same extension for the scheduled date and the scheduled time.

Aspects of the above system include wherein the at least one feature operation includes activating call unavailable for the at least one communication device to direct the incoming call to a messaging service for the scheduled date and the scheduled time.

Aspects of the above system include wherein the at least one feature operation includes activating call available for the at least one communication device and changing a ring tone notification to a vibrator notification.

Aspects of the above system include wherein processing the entry to determine how to handle an incoming call includes overriding any previously scheduled feature operation that conflicts with the at least one feature operation at an overlapping scheduled date and scheduled time.

Aspects of the above system include wherein the at least one processor of the remote server is operative to authenticate a user of the at least one communication device before receiving the entry containing the at least one feature operation.

Aspects of the above system include wherein the at least one processor of the remote server is operative to alert the user of any scheduling creation conflict between any feature operation entered on the at least one communication device and the at least one feature operation at an overlapping scheduled date and scheduled time.

Aspects of the above system include wherein processing the entry to determine how to handle the incoming call includes not overriding any previously scheduled operation that is mutually exclusive with the at least one feature operation at an overlapping scheduled date and scheduled time.

Embodiments of the present disclosure include a computer-readable storage device having instructions stored thereon that, in response to execution, cause a processor to schedule feature operations on a remote server to modify a behavior of at least one communication device of a plurality of communication devices, including receiving an entry for at least one feature operation for the at least one communication device of the plurality of communication devices registered with a same extension, wherein the entry includes a scheduled date and a scheduled time for the at least one feature operation; processing the entry to determine how to handle an incoming call during the scheduled date and the scheduled time for the at least one feature operation; generating a scheduled feature operation for the at least one feature operation; and modifying the behavior of the at least one communication device based on the scheduled feature operation.

Any one or more of the aspects/embodiments as substantially disclosed herein optionally in combination with any one or more other aspects/embodiments as substantially disclosed herein.

One or means adapted to perform any one or more of the above aspects/embodiments as substantially disclosed herein.

Methods described or claimed herein can be performed with traditional executable instruction sets that are finite and operate on a fixed set of inputs to provide one or more defined outputs. Alternatively or additionally, methods described or claimed herein can be performed using AI, machine learning, neural networks, or the like. In other words, a system or server is contemplated to include finite instruction sets and/or artificial intelligence-based models/neural networks to perform some or all of the steps described herein.

What is claimed is:

1. A method for scheduling feature operations on a remote server to modify a behavior of at least two communication devices of a plurality of communication devices, the method comprising:
   receiving, by the remote server, an entry for at least one feature operation for each of the at least two communication devices of the plurality of communication devices registered with a same extension,
      wherein each entry includes a scheduled date and a scheduled time for the at least one feature operation;
   processing, by the remote server, each entry to determine how to handle an incoming call during the scheduled date and time for the at least one feature operation;
   generating, by the remote server, a scheduled feature operation for each entry;
   simultaneously modifying, by the remote server, the behavior of each of the at least two communication devices based on the scheduled feature operation for each entry;
   transmitting, by the remote server, a scheduling page including a list of the plurality of communication devices, a list of a plurality of feature operations for selection, and each entry representing the at least one feature operation;
   determining, by the remote server, that the incoming call has been received from a third party by at least one of the two communication devices at a time during the scheduled date and time for the at least one feature operation;
   determining, by the remote server, that a scheduling conflict exists by comparing a feature operation manually entered by a user on the at least two communication devices with the scheduled feature operation in response to receiving the incoming call;
   alerting, by the remote server, the user of each of the at least two communication devices of any of the scheduling conflict between any feature operation manually entered by the user on each of the at least two communication devices and any previously scheduled feature operation at an overlapping scheduled date and scheduled time at the time of the incoming call, by sending a message to at least one of the plurality of communication devices;
   resolving, by the remote server, the scheduling conflict by modifying or cancelling the feature operation manually entered by the user or the scheduled feature operation in response to sending the message to at least one of the plurality of communication devices; and
   applying, by the remote server, the feature operation manually entered by the user or the scheduled feature operation to the incoming call based on resolving the scheduling conflict.

2. The method according to claim 1, wherein the at least one feature operation includes activating call-forwarding for one of the at least two communication devices to forward the incoming call from the one of the at least two communication devices to another of the plurality of communication devices registered with the same extension for the scheduled date and the scheduled time.

3. The method according to claim 1, wherein the at least one feature operation includes activating call unavailable for one of the at least two communication devices to direct the incoming call to a messaging service for the scheduled date and the scheduled time.

4. The method according to claim 1, wherein the at least one feature operation includes activating call available for one of the at least two communication devices and changing a ring tone notification to a vibrator notification.

5. The method according to claim 1, wherein processing each entry to determine how to handle the incoming call includes overriding any previously scheduled feature operation that conflicts with the at least one feature operation at an overlapping scheduled date and scheduled time.

6. The method according to claim 1, wherein processing each entry to determine how to handle the incoming call includes not overriding any previously scheduled operation that is mutually exclusive with the at least one feature operation at an overlapping scheduled date and scheduled time.

7. The method according to claim 1, wherein processing each entry to determine how to handle the incoming call includes retrieving a system administrator rule for conflict resolution for any previously scheduled feature operation that conflicts with the at least one feature operation at an overlapping scheduled date and scheduled time.

8. The method according to claim 1, further comprising authenticating, by the remote server, the user of each of the at least two communication devices, before receiving each entry containing the at least one feature operation.

9. The method according to claim 8, further comprising alerting, by the remote server, the user of any scheduling creation conflict between any previously scheduled feature operation and the at least one feature operation at an overlapping scheduled date and scheduled time.

10. The method according to claim 8, wherein processing each entry to determine how to handle the incoming call includes overriding any feature operation entered on each of the at least two communication devices that conflicts with the at least one feature operation at an overlapping scheduled date and scheduled time.

11. A system for scheduling feature operations on a remote server to modify a behavior of at least two communication devices of a plurality of communication devices, comprising:
   a memory; and
   at least one processor of the remote server, coupled to the memory, operative to:
   receive an entry for at least one feature operation for each of the at least two communication devices of the plurality of communication devices registered with a same extension,
      wherein each entry includes a scheduled date and a scheduled time for the at least one feature operation;
   process each entry to determine how to handle an incoming call during the scheduled date and the scheduled time for the at least one feature operation;
   generate a scheduled feature operation for each entry for the at least one feature operation;
   simultaneously modify the behavior of each of the at least two communication devices based on the scheduled feature operation for each entry;
   transmit a scheduling page including a list of the plurality of communication devices, a list of a plurality of feature operations for selection, and each entry representing the at least one feature operation;

determine that the incoming call has been received from a third party by at least one of the two communication devices at a time during the scheduled date and time for the at least one feature operation;

determine that a scheduling conflict exists by comparing a feature operation manually entered by a user on the at least two communication devices with the scheduled feature operation in response to receiving the incoming call;

alert the user of each of the at least two communication devices of any of the scheduling conflict between any feature operation manually entered by the user on each of the at least two communication devices and any previously scheduled feature operation at an overlapping scheduled date and scheduled time at the time of the incoming call, by sending a message to at least one of the plurality of communication devices;

resolve the scheduling conflict by modifying or cancelling the feature operation manually entered by the user or the scheduled feature operation in response to sending the message to at least one of the plurality of communication devices; and apply feature operation manually entered by the user or the scheduled feature operation to the incoming call based on resolving the scheduling conflict.

12. The system according to claim 11, wherein the at least one feature operation includes activating call-forwarding for one of the at least two communication devices to forward the incoming call from the one of the at least two communication devices to another of the plurality of communication devices registered with the same extension for the scheduled date and the scheduled time.

13. The system according to claim 11, wherein the at least one feature operation includes activating call unavailable for one of the at least two communication devices to direct the incoming call to a messaging service for the scheduled date and the scheduled time.

14. The system according to claim 11, wherein the at least one feature operation includes activating call available for one of the at least two communication devices and changing a ring tone notification to a vibrator notification.

15. The system according to claim 11, wherein processing each entry to determine how to handle an incoming call includes overriding any previously scheduled feature operation that conflicts with the at least one feature operation at an overlapping scheduled date and scheduled time.

16. The system according to claim 11, wherein the at least one processor of the remote server is operative to authenticate a user of each of the at least two communication devices before receiving each entry containing the at least one feature operation.

17. The system according to claim 16, wherein the at least one processor of the remote server is operative to alert the user of any scheduling creation conflict between any feature operation entered on each of the at least two communication devices and the at least one feature operation at an overlapping scheduled date and scheduled time.

18. The system according to claim 11 wherein processing each entry to determine how to handle the incoming call includes not overriding any previously scheduled operation that is mutually exclusive with the at least one feature operation at an overlapping scheduled date and schedule time.

19. A computer-readable storage device having instructions stored thereon that, in response to execution, cause a processor to schedule feature operations on a remote server to modify a behavior of at least two communication devices of a plurality of communication devices, comprising:

receiving an entry for at least one feature operation for each of the at least two communication devices of the plurality of communication devices registered with a same extension, wherein each entry includes a scheduled date and a scheduled time for the at least one feature operation;

processing each entry to determine how to handle an incoming call during the scheduled date and scheduled time for the at least one feature operation;

generating a scheduled feature operation for each entry for the at least one feature operation;

simultaneously modifying the behavior of each of the at least two communication devices based on the scheduled feature operation for each entry;

transmitting a scheduling page including a list of the plurality of communication devices, a list of a plurality of feature operations for selection, and each entry representing the at least one feature operation;

determining that the incoming call has been received from a third party by at least one of the two communication devices at a time during the scheduled date and time for the at least one feature operation;

determining that a scheduling conflict exists by comparing a feature operation manually entered by a user on the at least two communication devices with the scheduled feature operation in response to receiving the incoming call;

alerting the user of each of the at least two communication devices of any of the scheduling conflict between any feature operation manually entered by the user on each of the at least two communication devices and any previously scheduled feature operation at an overlapping scheduled date and scheduled time at the time of the incoming call, by sending a message to at least one of the plurality of communication devices;

resolving the scheduling conflict by modifying or cancelling the feature operation manually entered by the user or the scheduled feature operation in response to sending the message to at least one of the plurality of communication devices; and applying the feature operation manually entered by the user or the scheduled feature operation to the incoming call based on resolving the scheduling conflict.

20. The computer-readable storage device according to claim 19, wherein the at least one feature operation includes activating call-forwarding for one of the at least two communication devices to forward the incoming call from the one of the at least two communication devices to another of the plurality of communication devices registered with the same extension for the scheduled date and the scheduled time.

* * * * *